(12) United States Patent  
Jetha et al.

(10) Patent No.: US 7,489,321 B2  
(45) Date of Patent: *Feb. 10, 2009

(54) USING DETAIL-IN-CONTEXT LENSES FOR ACCURATE DIGITAL IMAGE CROPPING AND MEASUREMENT

(75) Inventors: Zeenat Jetha, N. Vancouver (CA); Andrew Carlisle, Vancouver (CA); Andrew Skiers, N. Vancouver (CA); David Baar, Vancouver (CA)

(73) Assignee: Noregin Assets N.V., L.L.C., Dover, DE (US)

(*) Notice: Subject to any disclaimer, the term of this patent is extended or adjusted under 35 U.S.C. 154(b) by 303 days.

This patent is subject to a terminal disclaimer.

(21) Appl. No.: 11/443,124

(22) Filed: May 31, 2006

(65) Prior Publication Data

US 2006/0284888 A1  Dec. 21, 2006

Related U.S. Application Data

(63) Continuation of application No. 10/614,754, filed on Jul. 8, 2003, now Pat. No. 7,084,886.

(30) Foreign Application Priority Data

Jul. 16, 2002  (CA)  .................................... 2393708  
Jul. 18, 2002  (CA)  .................................... 2394119

(51) Int. Cl.  
  *G09G 5/00* (2006.01)

(52) U.S. Cl. ................ 345/620; 345/619; 345/622; 345/418; 345/647

(58) Field of Classification Search ................. 345/418, 345/619, 620, 622, 628, 647  
See application file for complete search history.

(56) References Cited

U.S. PATENT DOCUMENTS

| 3,201,546 | A | * | 8/1965 | Richardson | .................. 337/57 |
| 5,473,740 | A | * | 12/1995 | Kasson | ....................... 345/628 |
| 5,670,984 | A | * | 9/1997 | Robertson et al. | ........... 345/647 |
| 5,798,752 | A | * | 8/1998 | Buxton et al. | ............... 345/629 |
| 6,133,914 | A | * | 10/2000 | Rogers et al. | ............... 345/661 |
| 6,504,535 | B1 | * | 1/2003 | Edmark | ..................... 345/419 |
| 2001/0048447 | A1 | * | 12/2001 | Jogo | .......................... 345/620 |
| 2003/0174146 | A1 | * | 9/2003 | Kenoyer | ..................... 345/619 |
| 2004/0257380 | A1 | * | 12/2004 | Herbert et al. | .............. 345/619 |

* cited by examiner

*Primary Examiner*—Chante Harrison

(57) ABSTRACT

A method for cropping a computer generated original image on a display, comprising the steps of: adjusting a user-selected movable boundary on the original image to define a cropped image within the boundary, the boundary defined by two or more points on the original image; and, distorting the original image in regions surrounding the points, whereby the boundary is accurately positioned for cropping. And, a method for measuring within a computer generated original image on a display, comprising the steps of: adjusting a user-selected movable line segment on the original image to define points on the original image for measuring between; and, distorting the original image in regions surrounding the points, whereby the points are accurately positioned for measuring.

35 Claims, 15 Drawing Sheets

USING DETAIL-IN-CONTEXT LENSES FOR ACCURATE DIGITAL IMAGE CROPPING AND MEASUREMENT

This application is a continuation of U.S. patent application Ser. No. 10/614,754, filed Jul. 8, 2003 now U.S. Pat. No. 7,084,886, the disclosure of which is incorporated herein by reference.

This application claims priority from Canadian Patent Application Nos. 2,393,708 and 2,394,119 filed Jul. 16, 2002, and Jul. 18, 2002, respectively, the disclosures of which are incorporated herein by reference.

This invention relates to the field of computer graphics processing, and more specifically, to a method and system for accurate digital image cropping and measurement using detail-in-context lenses and a detail-in-context graphical user interface ("GUI").

BACKGROUND OF THE INVENTION

In computer graphics systems, users often wish to exclude portions of an image presented to them on a display screen. This operation is called "cropping". To perform a cropping operation or crop, a user typically selects two points to define a rectangle (e.g. top left and bottom right corners) enclosing a selected portion of the original image. The portion of the original image outside of the rectangle is then excluded or cropped and an image of the selected portion alone, that is, a cropped image, is presented to the user.

One problem with present cropping methods is that a user may have difficulty selecting a desirable cropped image. Thus, a user may have to repeat the cropping operation several times in order to achieve the desired result.

One solution to this problem is suggested by Kasson in U.S. Pat. No. 5,473,740. Kasson describes a cropping method in which the cropped or excluded area of the image is blanked-out during the process of adjusting the rectangle defining the selected area. According to Kasson, the excluded portion of the image distracts the user and makes it more difficult to visualize the cropped image. In Kasson, a user moves a mouse to position a cursor on the original image and depresses the mouse pushbutton to designate a first corner $(x_1, y_1)$ of the initially desired rectangular cropped image. The mouse is then manually moved and the sequentially updated position of the cursor instantaneously defines a second corner $(x_2, y_2)$ diagonally opposite the first corner. All the time the mouse is moved and its pushbutton still depressed a sequentially varying area potential cropped image and a correspondingly sized obscured portion are displayed. If the user is satisfied with the aesthetics of the current cropped image, the user releases the mouse pushbutton, moves the cursor within the boundaries of the current cropped image and double clicks in order to select this cropped image for further processing, such as inclusion into a document being concurrently displayed in another window. Alternatively, any two of $x_1, y_1, x_2$ and $y_2$ can be updated by positioning the cursor over one of the four corners of the rectangular boundary of the current cropped image, depressing the mouse pushbutton, and holding it down while the cursor is moved.

Another solution was suggested by Cariffe, et al., in U.S. Pat. No. 6,201,548. Cariffe, et al. describe a cropping method in which after the cropped image has been formed and is displayed in a new window, the window containing the original image is also maintained and may be viewed concurrently with the cropped image. Moreover, the window containing the original image is preferably automatically minimized, that is, reduced in size to what is called an "iconified" version of the original, but may subsequently be restored to full size. If subsequent comparison by the user of both the original and cropped images side-by-side show an unwanted result, the cropping operation may then be repeated on the image in the original image window, which preferably does not get modified in any way by single or multiple sequential cropping operations.

However, while Kasson and Cariffer, et al. describe cropping methods that may provide a user with a desired cropped image after several iterations, neither of these methods provides for the accurate positioning of the bounds of the cropped image at the outset. Thus, and especially for large image presentations such as digital maps, a user may still have to repeat the cropping operation several times in order to accurately crop the original image. For example, while a user may use well-known "panning" and "zooming" tools to view one corner of the rectangle defining the selected portion of an original image in order to relocate that corner, in doing so, the relative location of the second corner of the rectangle may be lost to the user or the user may find it difficult to determine what portion of the original image is being observed. In other words, while the user may have gained a detailed view of a region of the original image that is of interest, the user may lose sight of the context within which that region is positioned. This is an example of what is often referred to as the "screen real estate problem".

A need therefore exists for an improved method and system for accurate digital image cropping. In addition, a need exist for an improved method and system for accurately selecting points in digital images for editing operations such as cropping and for related operations such as distance measurement. Consequently, it is an object of the present invention to obviate or mitigate at least some of the above mentioned disadvantages.

SUMMARY OF THE INVENTION

According to one aspect of the invention, there is provided a method for cropping a computer generated original image on a display, comprising the steps of: adjusting a user-selected movable boundary on the original image to define a cropped image within the boundary, the boundary defined by two or more points on the original image; and, distorting the original image in regions surrounding the points, whereby the boundary is accurately positioned for cropping.

Preferably, the step of distorting further includes the steps of: creating a lens surface for one or more of the regions; and, transforming the original image by applying a distortion function defining the lens surface to the original image.

Preferably, the step of creating further includes the step of displaying a GUI over one or more of the regions for adjusting the lens surface.

Preferably, the lens surface includes a focal region and a base region and the GUI includes: a slide bar icon for adjusting a magnification for the lens surface; a slide bar icon for adjusting a degree of scooping for the lens surface; a bounding rectangle icon with at least one handle icon for adjusting a size and a shape for the focal region; a bounding rectangle icon with at least one handle icon for adjusting a size and a shape for the base region; a move icon for adjusting a location for the lens surface on the boundary; a pickup icon for adjusting a location for the base region within the original image; and, a fold icon for adjusting a location for the focal region relative to the base region.

Preferably, the adjusting is performed by moving a cursor on the display with a pointing device, the cursor is an icon, the pointing device is a mouse, and the movable boundary is a polygon.

Preferably, the original image has one or more layers, the regions have a predetermined selection of these layers, and the cropped image has a predetermined selection of these layers.

Advantageously, by using detail-in-context lenses to select points defining an area for a cropped image, a user can view a large area (i.e. outside the lenses) while focusing in on smaller areas (i.e. inside the focal regions of the lenses) surrounding the selected points. This makes it possible for a user to perform accurate cropping without losing visibility or context of the portion of the original image surrounding the cropped area.

According to another aspect of the invention, there is provided a method for measuring within a computer generated original image on a display, comprising the steps of: adjusting a user-selected movable line segment on the original image to define points on the original image for measuring between; and, distorting the original image in regions surrounding the points, whereby the points are accurately positioned for measuring.

Preferably, the step of distorting further includes the steps of: creating a lens surface for one or more of the regions; and, transforming the original image by applying a distortion function defining the lens surface to the original image.

Preferably, the step of creating further includes the step of displaying a GUI over one or more of the regions for adjusting the lens surface.

Preferably, the lens surface includes a focal region and a base region and the GUI includes: a slide bar icon for adjusting a magnification for the lens surface; a slide bar icon for adjusting a degree of scooping for the lens surface; a bounding rectangle icon with at least one handle icon for adjusting a size and a shape for the focal region; a bounding rectangle icon with at least one handle icon for adjusting a size and a shape for the base region; a move icon for adjusting a location for the lens surface on the boundary; a pickup icon for adjusting a location for the base region within the original image; and, a fold icon for adjusting a location for the focal region relative to the base region.

Preferably, the adjusting is performed by moving a cursor on the display with a pointing device, the cursor is an icon, the pointing device is a mouse, and the line segment is a straight line.

Advantageously, by using detail-in-context lenses to select points for measuring between, a user can view a large area (i.e. outside the lenses) while focusing in on smaller areas (i.e. inside the focal regions of the lenses) surrounding the selected points. This makes it possible for a user to perform accurate measuring without losing visibility or context of the portion of the original image surrounding the points. Moreover, because the selected points are contained within the focal region of each lens, which may be displayed at a higher resolution that the surrounding presentation, the measured value may be determined more accurately.

BRIEF DESCRIPTION OF THE DRAWINGS

Embodiments of the invention may best be understood by referring to the following description and accompanying drawings. In the description and drawings, like numerals refer to like structures or processes. In the drawings.

DETAILED DESCRIPTION OF THE PREFERRED EMBODIMENTS

Figure 1:
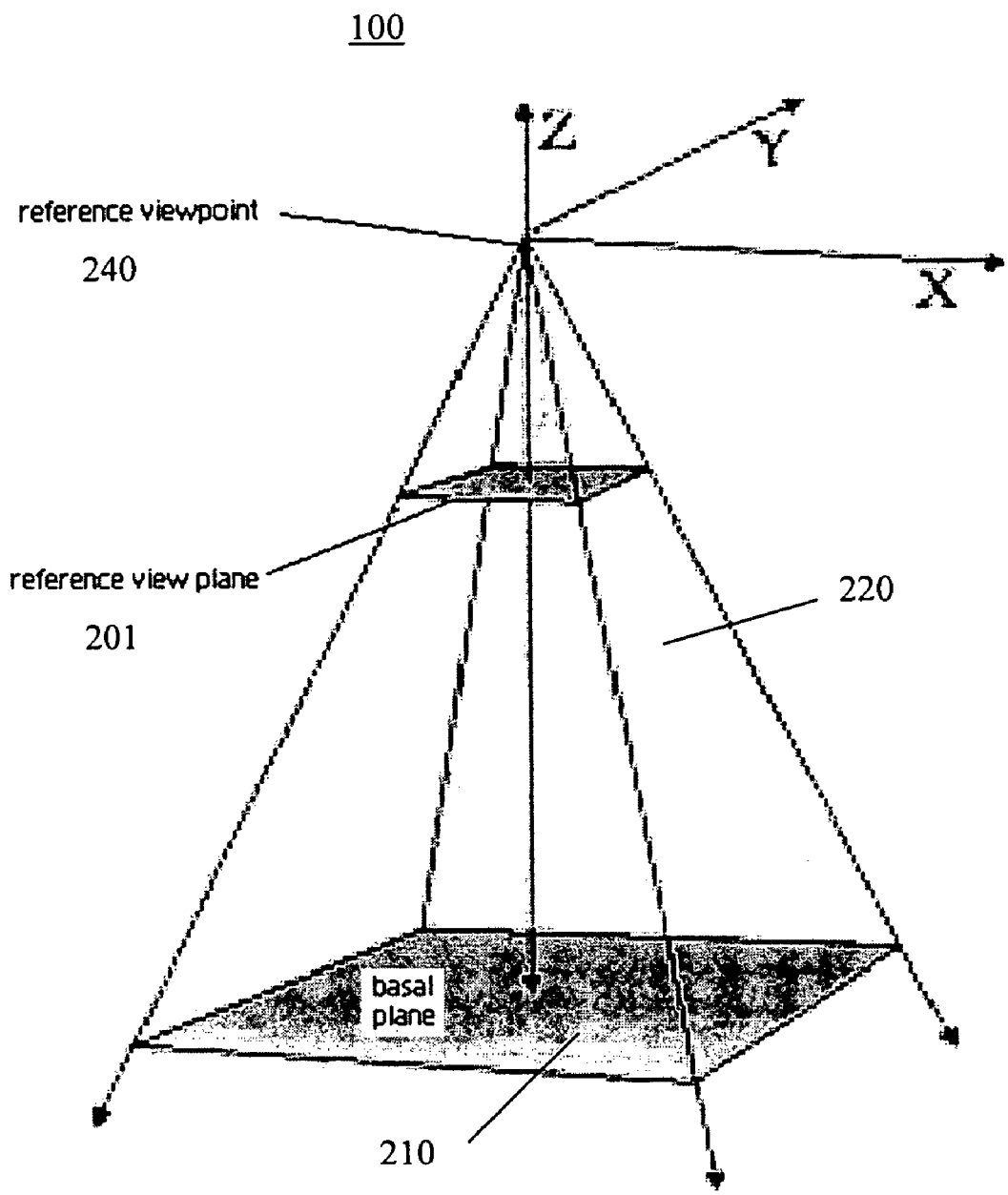
FIG. 1 is a graphical representation of the geometry for constructing a three-dimensional (3D) perspective viewing frustum, relative to an x, y, z coordinate system, in accordance with known elastic presentation space graphics technology.

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention. The term "data processing system" is used herein to refer to any machine for processing data, including the computer systems and network arrangements described herein.

The "screen real estate problem" mentioned above generally arises whenever large amounts of information are to be displayed on a display screen of limited size. As discussed, well-known tools to address this problem include panning and zooming. While these tools are suitable for a large number of visual display applications, they become less effective where sections of the visual information are spatially related, such as in maps, three-dimensional representations, and newspapers, for example. In this type of information display, panning and zooming are not as effective as much of the context of the panned or zoomed display may be hidden.

A recent solution to this problem is the application of "detail-in-context" presentation techniques. Detail-in-context is the magnification of a particular region-of-interest (the "focal region" or "detail") in a data presentation while preserving visibility of the surrounding information (the "context"). This technique has applicability to the display of large surface area media (e.g. digital maps) on computer screens of variable size including graphics workstations, laptop computers, personal digital assistants ("PDAs"), and cell phones.

In the detail-in-context discourse, differentiation is often made between the terms "representation" and "presentation". A representation is a formal system, or mapping, for specifying raw information or data that is stored in a computer or data processing system. For example, a digital map of a city is a representation of raw data including street names and the relative geographic location of streets and utilities. Such a representation may be displayed visually on a computer screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

In general, a detail-in-context presentation may be considered as a distorted view (or distortion) of a portion of the original representation where the distortion is the result of the application of a "lens" like distortion function to the original representation. A detailed review of various detail-in-context presentation techniques such as "Elastic Presentation Space" ("EPS") (or "Pliable Display Technology" ("PDT")) may be found in a publication by Marianne S. T. Carpendale, entitled "A Framework for Elastic Presentation Space" (Carpendale, Marianne S. T., *A Framework for Elastic Presentation Space* (Burnaby, British Columbia: Simon Fraser University, 1999)), and incorporated herein by reference.

In general, detail-in-context data presentations are characterized by magnification of areas of an image where detail is desired, in combination with compression of a restricted range of areas of the remaining information (i.e. the context), the result typically giving the appearance of a lens having been applied to the display surface. Using the techniques described by Carpendale, points in a representation are displaced in three dimensions and a perspective projection is used to display the points on a two-dimensional presentation display. Thus, when a lens is applied to a two-dimensional continuous surface representation, for example, the resulting presentation appears to be three-dimensional. In other words, the lens transformation appears to have stretched the continuous surface in a third dimension. In EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection.

FIG. 1 is a graphical representation 100 of the geometry for constructing a three-dimensional ("3D") perspective viewing frustum 220, relative to an x, y, z coordinate system, in accordance with known elastic presentation space (EPS) graphics technology. In EPS technology, detail-in-context views of two-dimensional ("2D") visual representations are created with sight-line aligned distortions of a 2D information presentation surface within a 3D perspective viewing frustum 220. In EPS, magnification of regions of interest and the accompanying compression of the contextual region to accommodate this change in scale are produced by the movement of regions of the surface towards the viewpoint ("VP") 240 located at the apex of the pyramidal shape 220 containing the frustum. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
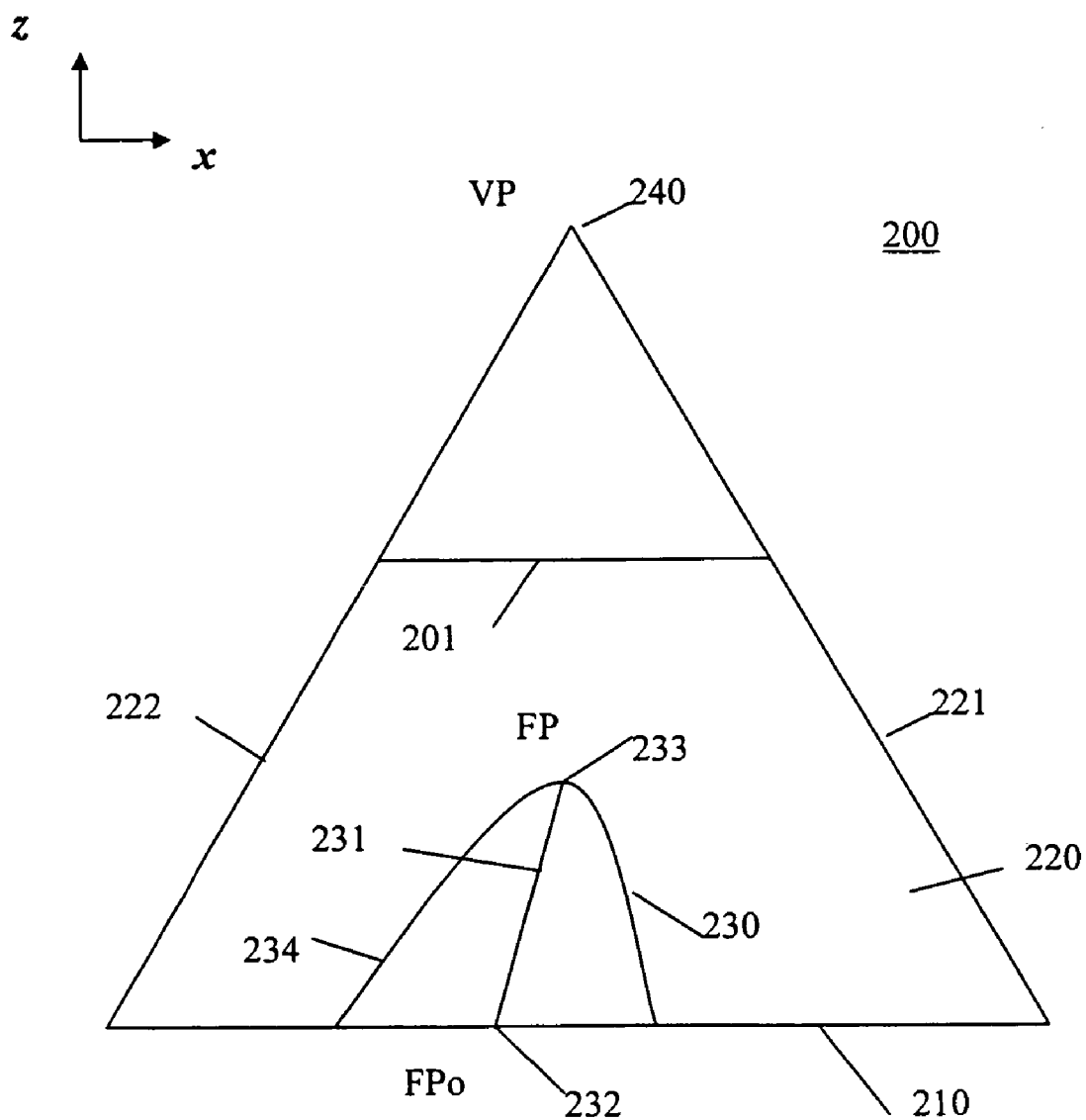
FIG. 2 is a graphical representation of the geometry of a presentation in accordance with known elastic presentation space graphics technology.

FIG. 2 is a graphical representation 200 of the geometry of a presentation in accordance with known EPS graphics technology. EPS graphics technology employs viewer-aligned perspective projections to produce detail-in-context presentations in a reference view plane 201 which may be viewed on a display. Undistorted 2D data points are located in a basal plane 210 of a 3D perspective viewing volume or frustum 220 which is defined by extreme rays 221 and 222 and the basal plane 210. The VP 240 is generally located above the centre point of the basal plane 210 and reference view plane ("RVP") 201. Points in the basal plane 210 are displaced upward onto a distorted surface 230 which is defined by a general 3D distortion function (i.e. a detail-in-context distortion basis function). The direction of the viewer-aligned perspective projection corresponding to the distorted surface 230 is indicated by the line FPo-FP 231 drawn from a point FPo 232 in the basal plane 210 through the point FP 233 which corresponds to the focus or focal region or focal point of the distorted surface 230.

EPS is applicable to multidimensional data and is well suited to implementation on a computer for dynamic detail-in-context display on an electronic display surface such as a monitor. In the case of two dimensional data, EPS is typically characterized by magnification of areas of an image where detail is desired 233, in combination with compression of a restricted range of areas of the remaining information (i.e. the context) 234, the end result typically giving the appearance of a lens 230 having been applied to the display surface. The areas of the lens 230 where compression occurs may be referred to as the "shoulder" 234 of the lens 230. The area of the representation transformed by the lens may be referred to as the "lensed area". The lensed area thus includes the focal region and the shoulder. To reiterate, the source image or representation to be viewed is located in the basal plane 210. Magnification 233 and compression 234 are achieved through elevating elements of the source image relative to the basal plane 210, and then projecting the resultant distorted surface onto the reference view plane 201. EPS performs detail-in-context presentation of n-dimensional data through the use of a procedure wherein the data is mapped into a region in an (n+1) dimensional space, manipulated through perspective projections in the (n+1) dimensional space, and then finally transformed back into n-dimensional space for presentation. EPS has numerous advantages over conventional zoom, pan, and scroll technologies, including the capability of preserving the visibility of information outside 234 the local region of interest 233.

For example, and referring to FIGS. 1 and 2, in two dimensions, EPS can be implemented through the projection of an image onto a reference plane 201 in the following manner. The source image or representation is located on a basal plane 210, and those regions of interest 233 of the image for which magnification is desired are elevated so as to move them closer to a reference plane situated between the reference viewpoint 240 and the reference view plane 201. Magnification of the focal region 233 closest to the RVP 201 varies inversely with distance from the RVP 201. As shown in FIGS. 1 and 2, compression of regions 234 outside the focal region 233 is a function of both distance from the RVP 201, and the gradient of the function describing the vertical distance from the RVP 201 with respect to horizontal distance from the focal region 233. The resultant combination of magnification 233 and compression 234 of the image as seen from the reference viewpoint 240 results in a lens-like effect similar to that of a magnifying glass applied to the image. Hence, the various functions used to vary the magnification and compression of the source image via vertical displacement from the basal plane 210 are described as lenses, lens types, or lens functions. Lens functions that describe basic lens types with point and circular focal regions, as well as certain more complex lenses and advanced capabilities such as folding, have previously been described by Carpendale.

System.

Figure 3:
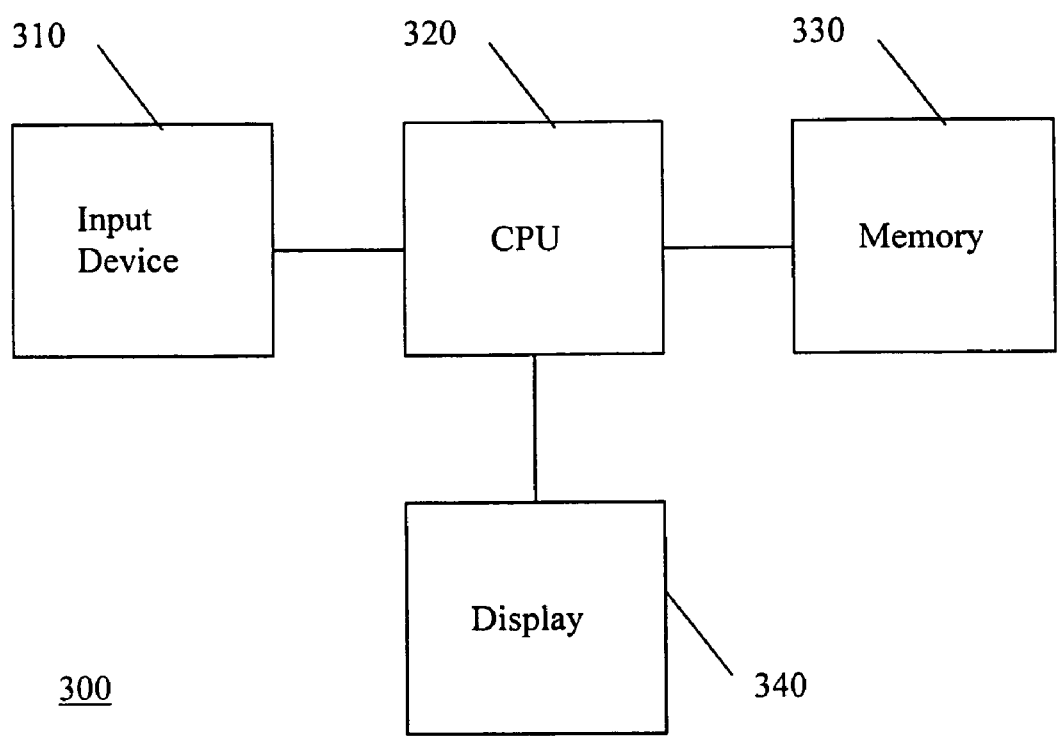
FIG. 3 is a block diagram illustrating a data processing system adapted for implementing an embodiment of the invention.

FIG. 3 is a block diagram of a data processing system 300 adapted to implement an embodiment of the invention. The data processing system is suitable for implementing EPS technology, for displaying detail-in-context presentations of representations, and for cropping representations in conjunction with a detail-in-context graphical user interface ("GUI") 400, as described below. The data processing system 300 includes an input device 310, a central processing unit or CPU 320, memory 330, and a display 340. The input device 310 may include a keyboard, mouse, trackball, or similar device. The CPU 320 may include dedicated coprocessors and memory devices. The memory 330 may include RAM, ROM, databases, or disk devices. And, the display 340 may include a computer screen, terminal device, or a hardcopy producing output device such as a printer or plotter. The data processing system 300 has stored therein data representing sequences of instructions which when executed cause the method described herein to be performed. Of course, the data processing system 300 may contain additional software and hardware a description of which is not necessary for understanding the invention.

GUI with Lens Control Elements.

As mentioned, detail-in-context presentations of data using techniques such as pliable surfaces, as described by Carpendale, are useful in presenting large amounts of information on limited-size display surfaces. Detail-in-context views allow magnification of a particular region-of-interest (the "focal region") 233 in a data presentation while preserving the visibility of the surrounding information 210. In the following, a GUI 400 is described having lens control elements that can be implemented in software and applied to the cropping and measurement of representations and to the control of detail-in-context data presentations. The software can be loaded into and run by the data processing system 300 of FIG. 3.

Figure 4:
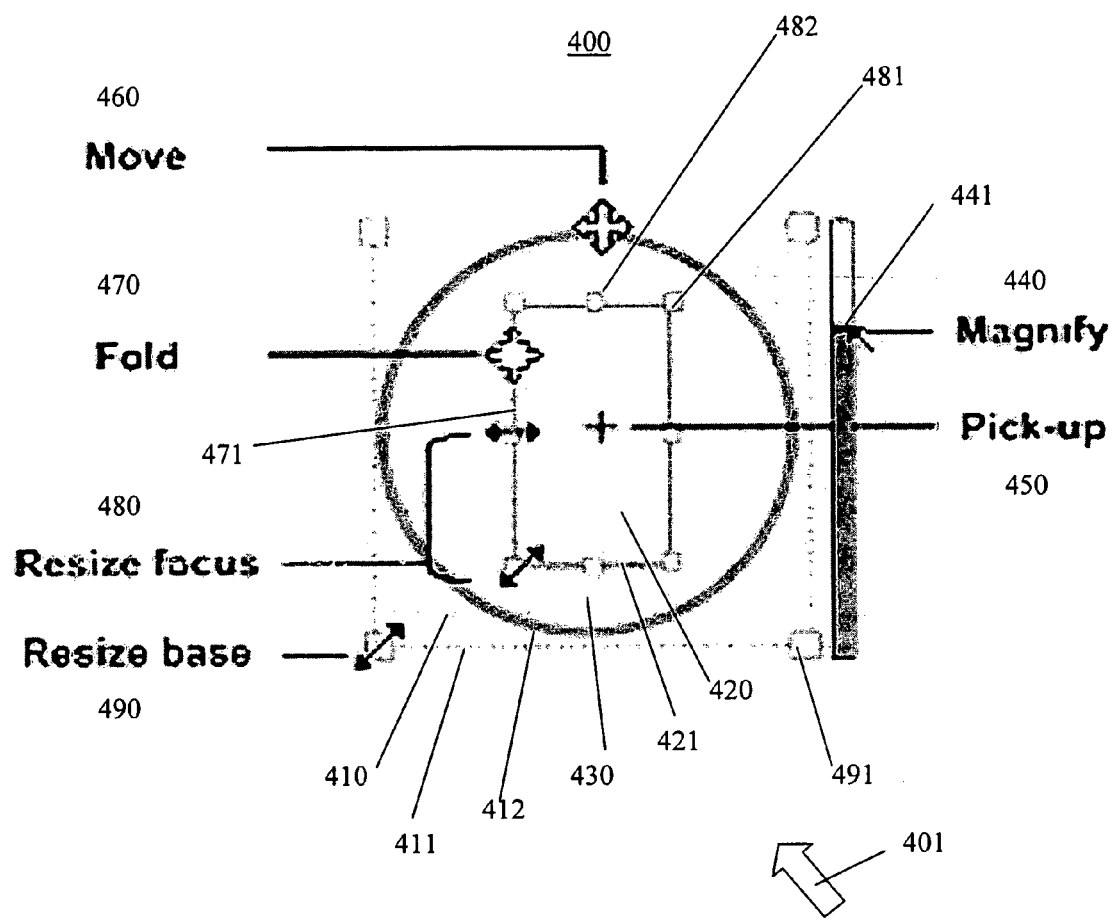
FIG. 4 a partial screen capture illustrating a GUI having lens control elements for user interaction with detail-in-context data presentations in accordance with an embodiment of the invention.

FIG. 4 is a partial screen capture illustrating a GUI 400 having lens control elements for user interaction with detail-in-context data presentations in accordance with an embodiment of the invention. Detail-in-context data presentations are characterized by magnification of areas of an image where detail is desired, in combination with compression of a restricted range of areas of the remaining information (i.e. the context), the end result typically giving the appearance of a lens having been applied to the display screen surface. This lens 410 includes a "focal region" 420 having high magnification, a surrounding "shoulder region" 430 where information is typically visibly compressed, and a "base" 412 surrounding the shoulder region 430 and defining the extent of the lens 410. In FIG. 4, the lens 410 is shown with a circular shaped base 412 (or outline) and with a focal region 420 lying near the center of the lens 410. However, the lens 410 and focal region 420 may have any desired shape. For example, in FIG. 5, the lenses 510, 511 have a pyramid shape with flat tops 520, 521 and trapezoidal shoulders 530, 531. As mentioned above, the base of the lens 412 may be coextensive with the focal region 420.

In general, the GUI 400 has lens control elements that, in combination, provide for the interactive control of the lens 410, 510, 511. The effective control of the characteristics of the lens 410 by a user (i.e. dynamic interaction with a detail-in-context lens) is advantageous. At any given time, one or more of these lens control elements may be made visible to the user on the display surface 340 by appearing as overlay icons on the lens 410. Interaction with each element is performed via the motion of an input or pointing device 310 (e.g. mouse), with the motion resulting in an appropriate change in the corresponding lens characteristic. As will be described, selection of which lens control element is actively controlled by the motion of the pointing device 310 at any given time is determined by the proximity of the icon representing the pointing device 310 (e.g. cursor) on the display surface 340 to the appropriate component of the lens 410. For example, "dragging" of the pointing device at the periphery of the bounding rectangle of the lens base 412 causes a corresponding change in the size of the lens 410 (i.e. "resizing"). Thus, the GUI 400 provides the user with a visual representation of which lens control element is being adjusted through the display of one or more corresponding icons.

For ease of understanding, the following discussion will be in the context of using a two-dimensional pointing device 310 that is a mouse, but it will be understood that the invention may be practiced with other 2-D or 3-D (or even greater numbers of dimensions) pointing devices including a trackball and keyboard.

A mouse 310 controls the position of a cursor icon 401 that is displayed on the display screen 340. The cursor 401 is moved by moving the mouse 310 over a flat surface, such as the top of a desk, in the desired direction of movement of the cursor 401. Thus, the two-dimensional movement of the mouse 310 on the flat surface translates into a corresponding two-dimensional movement of the cursor 401 on the display screen 340.

A mouse 310 typically has one or more finger actuated control buttons (i.e. mouse buttons). While the mouse buttons can be used for different functions such as selecting a menu option pointed at by the cursor 401, the disclosed invention may use a single mouse button to "select" a lens 410 and to trace the movement of the cursor 401 along a desired path. Specifically, to select a lens 410, the cursor 401 is first located within the extent of the lens 410. In other words, the cursor 401 is "pointed" at the lens 410. Next, the mouse button is depressed and released. That is, the mouse button is "clicked". Selection is thus a point and click operation. To trace the movement of the cursor 401, the cursor 401 is located at the desired starting location, the mouse button is depressed to signal the computer 320 to activate a lens control element, and the mouse 310 is moved while maintaining the button depressed. After the desired path has been traced, the mouse button is released. This procedure is often referred to as "clicking" and "dragging" (i.e. a click and drag operation). It will be understood that a predetermined key on a keyboard 310 could also be used to activate a mouse click or drag. In the following, the term "clicking" will refer to the depression of a mouse button indicating a selection by the user and the term "dragging" will refer to the subsequent motion of the mouse 310 and cursor 401 without the release of the mouse button.

The GUI 400 may include the following lens control elements: move, pickup, resize base, resize focus, fold, magnify, and scoop. Each of these lens control elements has at least one lens control icon or alternate cursor icon associated with it. In general, when a lens 410 is selected by a user through a point and click operation, the following lens control icons may be displayed over the lens 410: pickup icon 450, base outline icon 412, base bounding rectangle icon 411, focal region bounding rectangle icon 421, handle icons 481, 482, 491, magnify slide bar icon 440, and scoop slide bar icon 540 (see FIG. 5). Typically, these icons are displayed simultaneously after selection of the lens 410. In addition, when the cursor 401 is located within the extent of a selected lens 410, an alternate cursor icon 460, 470, 480, 490 may be displayed over the lens 410 to replace the cursor 401 or may be displayed in combination with the cursor 401. These lens control elements, corresponding icons, and their effects on the characteristics of a lens 410 are described below with reference to FIG. 4.

In general, when a lens 410 is selected by a point and click operation, bounding rectangle icons 411, 421 are displayed surrounding the base 412 and focal region 420 of the selected lens 410 to indicate that the lens 410 has been selected. With respect to the bounding rectangles 411, 421 one might view them as glass windows enclosing the lens base 412 and focal region 420, respectively. The bounding rectangles 411, 421 include handle icons 481, 482, 491 allowing for direct manipulation of the enclosed base 412 and focal region 420 as will be explained below. Thus, the bounding rectangles 411, 421 not only inform the user that the lens 410 has been selected, but also provide the user with indications as to what manipulation operations might be possible for the selected lens 410 though use of the displayed handles 481, 482, 491. Note that it is well within the scope of the present invention to provide a bounding region having a shape other than generally rectangular. Such a bounding region could be of any of a great number of shapes including oblong, oval, ovoid, conical, cubic, cylindrical, polyhedral, spherical, etc.

Moreover, the cursor 401 provides a visual cue indicating the nature of an available lens control element. As such, the cursor 401 will generally change in form by simply pointing to a different lens control icon 450, 412, 411, 421, 481, 482, 491, 440, 540. For example, when resizing the base 412 of a lens 410 using a corner handle 491, the cursor 401 will change form to a resize icon 490 once it is pointed at (i.e. positioned over) the corner handle 491. The cursor 401 will remain in the form of the resize icon 490 until the cursor 401 has been moved away from the corner handle 491.

Move.

Lateral movement of a lens 410 is provided by the move lens control element of the GUI 400. This functionality is accomplished by the user first selecting the lens 410, 510, 511 through a point and click operation. Then, the user points to a point within the lens 410 that is other than a point lying on a lens control icon 450, 412, 411, 421, 481, 482, 491, 440, 540. When the cursor 401 is so located, a move icon 460 is displayed over the lens 410 to replace the cursor 401 or may be displayed in combination with the cursor 401. The move icon 460 not only informs the user that the lens 410 may be moved, but also provides the user with indications as to what movement operations are possible for the selected lens 410. For example, the move icon 460 may include arrowheads indicating up, down, left, and right motion. Next, the lens 410 is moved by a click and drag operation in which the user clicks and drags the lens 410 to the desired position on the screen 340 and then releases the mouse button 310. The lens 410 is locked in its new position until a further pickup and move operation is performed.

Pickup.

Lateral movement of a lens 410 is also provided by the pickup lens control element of the GUI. This functionality is accomplished by the user first selecting the lens 410 through a point and click operation. As mentioned above, when the lens 410 is selected a pickup icon 450 is displayed over the lens 410 near the centre of the lens 410. Typically, the pickup icon 450 will be a crosshairs. In addition, a base outline 412 is displayed over the lens 410 representing the base 412 of the lens 410. The crosshairs 450 and lens outline 412 not only inform the user that the lens has been selected, but also provides the user with an indication as to the pickup operation that is possible for the selected lens 410. Next, the user points at the crosshairs 450 with the cursor 401. Then, the lens outline 412 is moved by a click and drag operation in which the user clicks and drags the crosshairs 450 to the desired position on the screen 340 and then releases the mouse button 310. The full lens 410 is then moved to the new position and is locked there until a further pickup operation is performed. In contrast to the move operation described above, with the pickup operation, it is the outline 412 of the lens 410 that the user repositions rather than the full lens 410.

Resize Base.

Resizing of the base 412 (or outline) of a lens 410 is provided by the resize base lens control element of the GUI. After the lens 410 is selected, a bounding rectangle icon 411 is displayed surrounding the base 412. The bounding rectangle 411 includes handles 491. These handles 491 can be used to stretch the base 412 taller or shorter, wider or narrower, or proportionally larger or smaller. The corner handles 491 will keep the proportions the same while changing the size. The middle handles (not shown) will make the base 412 taller or shorter, wider or narrower. Resizing the base 412 by the corner handles 491 will keep the base 412 in proportion. Resizing the base 412 by the middle handles (not shown) will change the proportions of the base 412. That is, the middle handles (not shown) change the aspect ratio of the base 412 (i.e. the ratio between the height and the width of the bounding rectangle 411 of the base 412). When a user points at a handle 491 with the cursor 401 a resize icon 490 may be displayed over the handle 491 to replace the cursor 401 or may be displayed in combination with the cursor 401. The resize icon 490 not only informs the user that the handle 491 may be selected, but also provides the user with indications as to the resizing operations that are possible with the selected handle. For example, the resize icon 490 for a corner handle 491 may include arrows indicating proportional resizing. The resize icon (not shown) for a middle handle (not shown) may include arrows indicating width resizing or height resizing. After pointing at the desired handle 491, the user would click and drag the handle 491 until the desired shape and size for the base 412 is reached. Once the desired shape and size are reached, the user would release the mouse button 310. The base 412 of the lens 410 is then locked in its new size and shape until a further base resize operation is performed.

Resize Focus.

Resizing of the focal region 420 of a lens 410 is provided by the resize focus lens control element of the GUI. After the lens 410 is selected, a bounding rectangle icon 421 is displayed surrounding the focal region 420. The bounding rectangle 421 includes handles 481, 482. These handles 481, 482 can be used to stretch the focal region 420 taller or shorter, wider or narrower, or proportionally larger or smaller. The corner handles 481 will keep the proportions the same while changing the size. The middle handles 482 will make the focal region 420 taller or shorter, wider or narrower. Resizing the focal region 420 by the corner handles 481 will keep the focal region 420 in proportion. Resizing the focal region 420 by the middle handles 482 will change the proportions of the focal region 420. That is, the middle handles 482 change the aspect ratio of the focal region 420 (i.e. the ratio between the height and the width of the bounding rectangle 421 of the focal region 420). When a user points at a handle 481, 482 with the cursor 401 a resize icon 480 may be displayed over the handle 481, 482 to replace the cursor 401 or may be displayed in combination with the cursor 401. The resize icon 480 not only informs the user that a handle 481, 482 may be selected, but also provides the user with indications as to the resizing operations that are possible with the selected handle. For example, the resize icon 480 for a corner handle 481 may include arrows indicating proportional resizing. The resize icon 480 for a middle handle 482 may include arrows indicating width resizing or height resizing. After pointing at the desired handle 481, 482, the user would click and drag the handle 481, 482 until the desired shape and size for the focal region 420 is reached. Once the desired shape and size are reached, the user would release the mouse button 310. The focal region 420 is then locked in its new size and shape until a further focus resize operation is performed.

Fold.

Folding of the focal region 420 of a lens 410 is provided by the fold control element of the GUI. In general, control of the degree and direction of folding (i.e. skewing of the viewer aligned vector 231 as described by Carpendale) is accomplished by a click and drag operation on a point 471, other than a handle 481, 482, on the bounding rectangle 421 surrounding the focal region 420. The direction of folding is determined by the direction in which the point 471 is dragged. The degree of folding is determined by the magnitude of the translation of the cursor 401 during the drag. In general, the direction and degree of folding corresponds to the relative displacement of the focus 420 with respect to the lens base 410. In other words, and referring to FIG. 2, the direction and degree of folding corresponds to the displacement of the point FP 233 relative to the point FPo 232, where the vector joining the points FPo 232 and FP 233 defines the viewer aligned vector 231. In particular, after the lens 410 is selected, a bounding rectangle icon 421 is displayed surrounding the focal region 420. The bounding rectangle 421 includes handles 481, 482. When a user points at a point 471, other than a handle 481, 482, on the bounding rectangle 421 surrounding the focal region 420 with the cursor 401, a fold icon 470 may be displayed over the point 471 to replace the cursor 401 or may be displayed in combination with the cursor 401. The fold icon 470 not only informs the user that a point 471 on the bounding rectangle 421 may be selected, but also provides the user with indications as to what fold operations are possible. For example, the fold icon 470 may include arrowheads indicating up, down, left, and right motion. By choosing a point 471, other than a handle 481, 482, on the bounding rectangle 421 a user may control the degree and direction of folding. To control the direction of folding, the user would click on the point 471 and drag in the desired direction of folding. To control the degree of folding, the user would drag to a greater or lesser degree in the desired direction of folding. Once the desired direction and degree of folding is reached, the user would release the mouse button 310. The lens 410 is then locked with the selected fold until a further fold operation is performed.

Magnify.

Magnification of the lens 410 is provided by the magnify lens control element of the GUI. After the lens 410 is selected, the magnify control is presented to the user as a slide bar icon 440 near or adjacent to the lens 410 and typically to one side of the lens 410. Sliding the bar 441 of the slide bar 440 results in a proportional change in the magnification of the lens 410. The slide bar 440 not only informs the user that magnification of the lens 410 may be selected, but also provides the user with an indication as to what level of magnification is possible. The slide bar 440 includes a bar 441 that may be slid up and down, or left and right, to adjust and indicate the level of magnification. To control the level of magnification, the user would click on the bar 441 of the slide bar 440 and drag in the direction of desired magnification level. Once the desired level of magnification is reached, the user would release the mouse button 310. The lens 410 is then locked with the selected magnification until a further magnification operation is performed. In general, the focal region 420 is an area of the lens 410 having constant magnification (i.e. if the focal region is a plane). Again referring to FIGS. 1 and 2, magnification of the focal region 420, 233 varies inversely with the distance from the focal region 420, 233 to the reference view plane (RVP) 201. Magnification of areas lying in the shoulder region 430 of the lens 410 also varies inversely with their distance from the RVP 201. Thus, magnification of areas lying in the shoulder region 430 will range from unity at the base 412 to the level of magnification of the focal region 420.

Scoop.

The concavity or "scoop" of the shoulder region 430 of the lens 410 is provided by the scoop lens control element of the GUI. After the lens 410 is selected, the scoop control is presented to the user as a slide bar icon 540 (see FIG. 5) near or adjacent to the lens 410, 510, 511 and typically below the lens 410. Sliding the bar 541 of the slide bar 540 results in a proportional change in the concavity or scoop of the shoulder region 430 of the lens 410. The slide bar 540 not only informs the user that the shape of the shoulder region 430 of the lens 410 may be selected, but also provides the user with an indication as to what degree of shaping is possible. The slide bar 540 includes a bar 541 that may be slid left and right, or up and down, to adjust and indicate the degree of scooping. To control the degree of scooping, the user would click on the bar 541 of the slide bar 540 and drag in the direction of desired scooping degree. Once the desired degree of scooping is reached, the user would release the mouse button 310. The lens 410 is then locked with the selected scoop until a further scooping operation is performed.

Icon Hiding.

Figure 5:
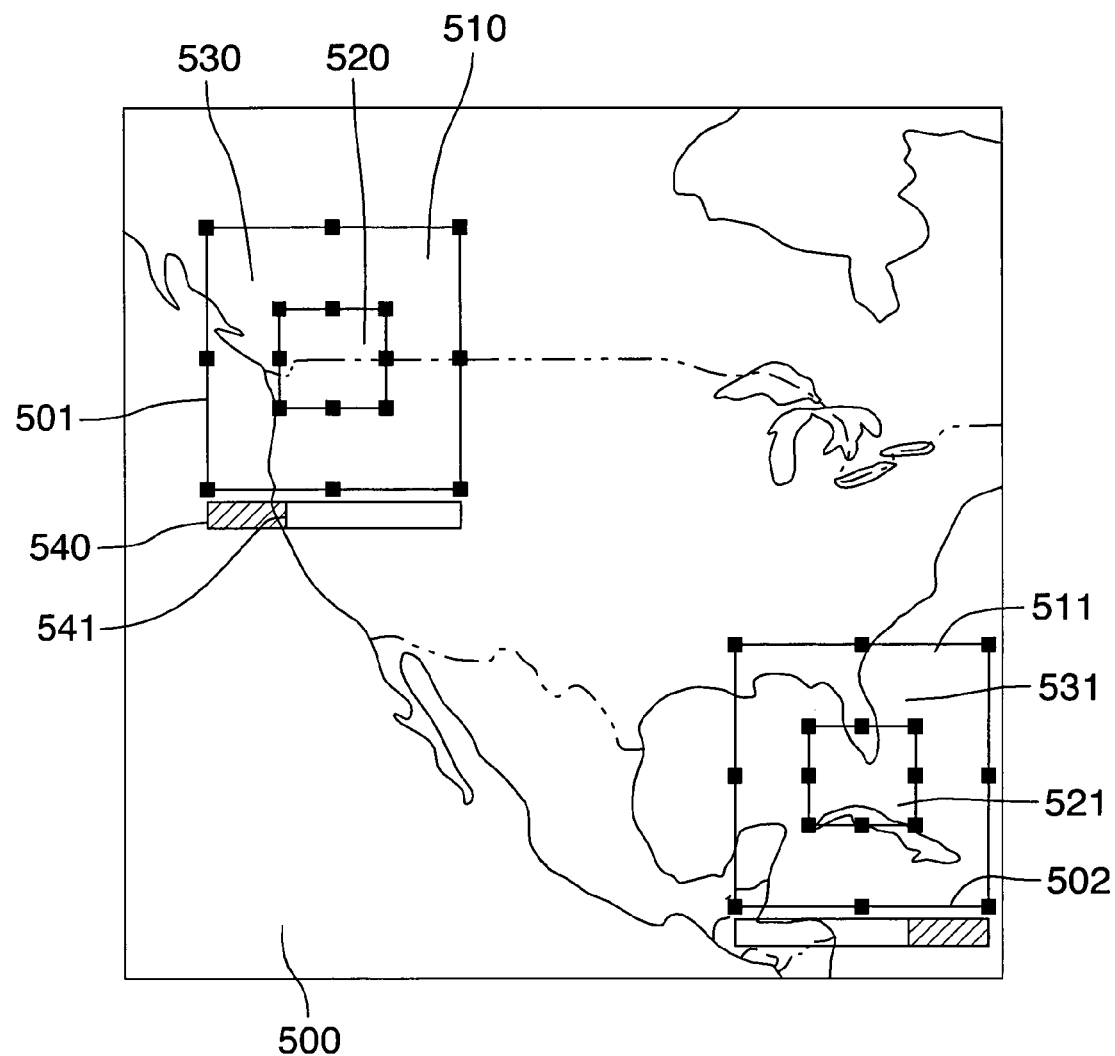
FIG. 5 is a screen capture illustrating a presentation having two detail-in-context lenses and associated GUIs for defining the corners of a bounding rectangle GUI for cropping an original digital image or representation in accordance with an embodiment of the invention.

Advantageously, a user may choose to hide one or more lens control icons 450, 412, 411, 421, 481, 482, 491, 440, 540 shown in FIGS. 4 and 5 from view so as not to impede the user's view of the image within the lens 410. This may be helpful, for example, during a move operation. A user may select this option through means such as a menu or lens property dialog box.

Cropping with Multiple Detail-In-Context Lenses.

Now, in accordance with the present invention, detail-in-context data viewing techniques are applied to the cropping and measurement of digital image presentations. Detail-in-context data viewing techniques allow a user to view multiple levels of detail or resolution on one display 340. The appearance of the data display or presentation is that of one or more virtual lens showing detail 233 within the context of a larger area view 210. Using multiple lenses in detail-in-context data presentations may be used to compare two regions of interest at the same time. Folding enhances this comparison by allowing the user to pull the regions of interest closer together. In accordance with the present invention, multiple detail-in-context lenses may be used to accurately crop digital images.

FIG. 5 is a screen capture illustrating a presentation 500 having two detail-in-context lenses 510, 511 and associated GUIs 501, 502 for defining the corners of a bounding rectangle GUI for cropping an original digital image or representation in accordance with an embodiment of the invention. In FIG. 5, the original image to be cropped is a map of North America. In order to produce a cropped image showing that portion of the United States from Washington State to Florida, for example, a user defines a first lens 510 over Washington State using a first GUI 501 and a second lens 511 over Florida using a second GUI 502. The lenses 510, 511 may be introduced to the original image to form the illustrated presentation through the use of a pull-down menu selection, tool bar icon, etc. The lenses 510, 511 are positioned at what will be the top left and bottom right corners of a bounding rectangle that will be used to define the cropped image. Using lens control elements for each GUI 501, 502, such as move, pickup, resize base, resize focus, fold, and magnify as described above, the user adjusts each lens 510, 511 to accurately select a point or corner for the creation of a bounding rectangle for cropping. Each selected point may be indicated on in the presentation with a crosshairs icon 450, for example. Using the magnify lens control element, for example, the user may magnify the focal region 520, 521 of each lens 510, 511 to pixel quality resolution making it easy to view, for example, the point where the boarders of Washington State and Canada meet in the first lens 510 and the point where land ends at the coast of Florida in the second lens 511.

Figure 6:
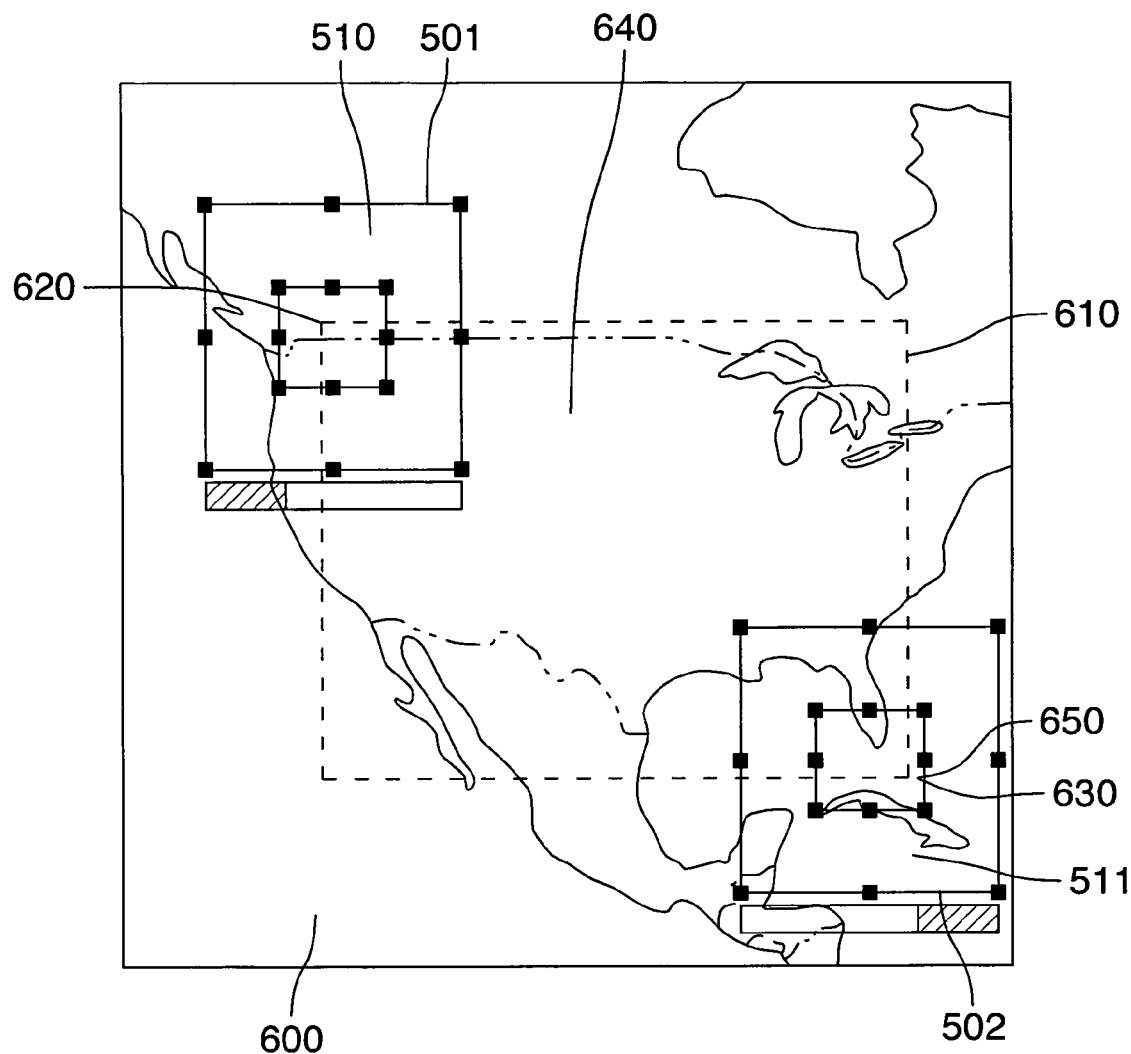
FIG. 6 is a screen capture illustrating a presentation having detail-in-context lenses, associated GUIs, and a bounding rectangle GUI or icon for cropping an original digital image or representation to produce a cropped image in accordance with an embodiment of the invention.

FIG. 6 is a screen capture illustrating a presentation 600 having detail-in-context lenses 510, 511, associated GUIs 501, 502, and a bounding rectangle GUI or icon 610 for cropping an original digital image or representation to produce a cropped image 640 in accordance with an embodiment of the invention. Once the lenses 510, 511 are in place, the user may use an existing tool to crop the presentation 600 to produce a cropped image 640. In FIG. 6, the user has defined an area with a bounding rectangle GUI 610. The bounding rectangle GUI 610, defining an area for the cropped image 640, may also be displaced or distorted by the lenses 510, 511, however, in FIG. 6, this is not shown. The resultant cropped image 640 may be presented with or without lens distortions 510, 511.

In operation, the data processing system 300 employs EPS techniques with an input device 310 and GUIs 501, 502, 610 for selecting points 620, 630 to define a cropped image 640 for display to a user on a display screen 340. Data representing an original image or representation is received by the CPU 320 of the data processing system 300. Using EPS techniques, the CPU 320 processes the data in accordance with instructions received from the user via an input device 310 and GUIs 501, 502 to produce a detail-in-context presentation 500. The presentation 500 is presented to the user on a display screen 340. It will be understood that the CPU 320 may apply a transformation to the shoulder regions 530, 531 surrounding the regions-of-interest 520, 521 to affect blending or folding in accordance with EPS technology. For example, the transformation may map the regions-of-interest 520, 521 and/or shoulder regions 530, 531 to a predefined lens surface, defined by a transformation or distortion function and having a variety of shapes, using EPS techniques. Or, the lens 510, 511 may be simply coextensive with the regions-of-interest 520, 521. Blending and folding of lenses in detail-in-context presentations are described in United States Patent Application Publication No. 2002/0044154 which is incorporated herein by reference.

The lens control elements of the GUIs 501, 502 are adjusted by the user via an input device 310 to control the characteristics of the lenses 510, 511 in the detail-in-context presentation 500. Using an input device 310 such as a mouse, a user adjusts parameters of the lens 510, 511 using icons and scroll bars of GUIs 501, 502 that are displayed over the lens on the display screen 340. The user may also adjust parameters of the image of the full scene 500. Signals representing input device 310 movements and selections are transmitted to the CPU 320 of the data processing system 300 where they are translated into instructions for lens control.

The bounding rectangle GUI 610 indicates the selected area for the cropped image 640. By moving the lenses 510, 511 on the display screen 310 with the lens GUIs 501, 502, the user can change the location of the corners 620, 630 (or regions-of-interest 520, 521) in the presentation 600. Of course, it is possible to use non-rectangular bounding GUIs for cropping. The bounding rectangle GUI 610 may be presented automatically upon placement of the lenses 510, 511 or its presentation may be selected using a pull-down menu selection, tool bar, crop icon, etc.

Observing the area enclosed by the bounding rectangle GUI 610, the user can decide whether or not the currently cropped image 640 accurately captures the desired area of the presentation 600. If the user is satisfied with the cropped image 640, the user may select the cropped image 640 by double clicking within the bounding rectangle GUI 610 or with a pull-down menu selection, crop icon, crop button, etc. The current cropped image 640 is thus selected for further processing, such as inclusion into a document being concurrently displayed in another window or replacement of the original presentation with the cropped image 640. Clicking on one of the corners 620, 630 will select the corresponding lens 510, 511 and GUI 501, 502 for adjustment. If the user is dissatisfied with the current cropped image 640, then the double clicking operation is avoided and instead a corner 620, 630 of the bounding rectangle GUI 610 can be moved to show a different cropped image 640.

Advantageously, by using detail-in-context lenses 510, 511 to select points 620, 630 defining an area for a cropped image 640, a user can view a large area 600 (i.e. outside the lenses 510, 511) while focusing in on smaller areas 520, 521 (i.e. inside the focal regions 520, 521 of the lenses 510, 511) surrounding the selected points 620, 630. This makes it possible for a user to perform accurate cropping without losing visibility or context of the portion of the original image surrounding the cropped area 640.

In the above embodiment, two lenses 510, 511 are added to the presentation 500 before the bounding rectangle GUI 610 is activated. However, according to another embodiment, the lenses 510, 511 and bounding rectangle GUI 610 can be combined. That is, the user may first add a lens 510 to a presentation 500 or the user may move a pre-existing lens into place at, say, the top left corner point 620 in FIG. 6. At this stage, before the second point 630 is selected, the bounding rectangle GUI 610 is activated. Now, to select the second point 630, the bottom right corner 650 of the bounding rectangle GUI 610 is moved (e.g. with a click and drag operation) by the user. As the bottom right corner 650 of the bounding rectangle GUI 610 is dragged, the second lens 511 is presented over and moves with the corner 650. This facilitates the accurate selection of the second point 630 for defining the cropped image 640.

In more detail, to select corner points 620, 630, the user first moves the mouse 310 to position a cursor 401 and depresses a mouse pushbutton to designate the first point or corner 620 of the desired cropped image 640. A first lens 510 is presented at this point. The location 620 of this first lens 510 or its characteristics may be adjusted as described above. The bounding rectangle GUI 610 is now activated by selecting from a pull-down menu for example. The first lens 510 is clicked and dragged to present the bounding rectangle GUI 610. As the mouse 310 is moved by the user to re-position the cursor 401 during the click and drag operation, the cursor's new position on the display 340 defines the second point or corner 630 diagonally opposite the first corner 620. The second lens 511 is presented over the second corner 630 during the click and draft operation. While the mouse 310 is moved with its pushbutton depressed (i.e. during the click and drag operation), a sequentially varying bounding rectangle GUI 610 for the potential cropped image 640 is displayed. If the user is satisfied with the cropped image 640, the user releases the mouse pushbutton to complete the click and drag operation. The user is then presented with a bounding rectangle GUI 610 with lens 510, 511 at opposite corners 620, 630. The user may then choose to complete the crop as described above (e.g. by double clicking within the bounding rectangle GUI 610).

As mentioned above, the bounding rectangle GUI 610 may have a shape other than rectangular. According to another embodiment, a polygonal shaped bounding GUI may be defined with three or more lens. In this case, the outline of the bounding GUI may pass through each lens. As the polygonal shape is drawn, say through an activation step, followed by a point and click to locate the first point, a series of click and drag operations to chose each subsequent point of the polygon, and ending with a double click operation, a lens is placed at each selected point or corner. Alternatively, between each click and drag operation when the crop line is being repositioned by the user via cursor and mouse, a lens may be presented over the end of the crop line (i.e. over the cursor's position). In other words, the end of the crop line is attached to a lens that moves with the crop line end as it is repositioned by a user. A lens may be left at each point or corner of the bounding polygon GUI with this alternative as well.

According to another embodiment of the invention, once a bounding rectangle or bounding polygon GUI has been established, a lens may be moved along the path of the bounding rectangle or polygon to allow a user to inspect the entire perimeter of the bounding rectangle or polygon. This is advantageous as the user may accurately select all points along the perimeter of the bounding rectangle or polygon rather that just corners or line segment end points. In so doing, a more accurate cropped image 640 may be produced.

Measuring with Multiple Detail-In-Context Lenses.

Figure 7:
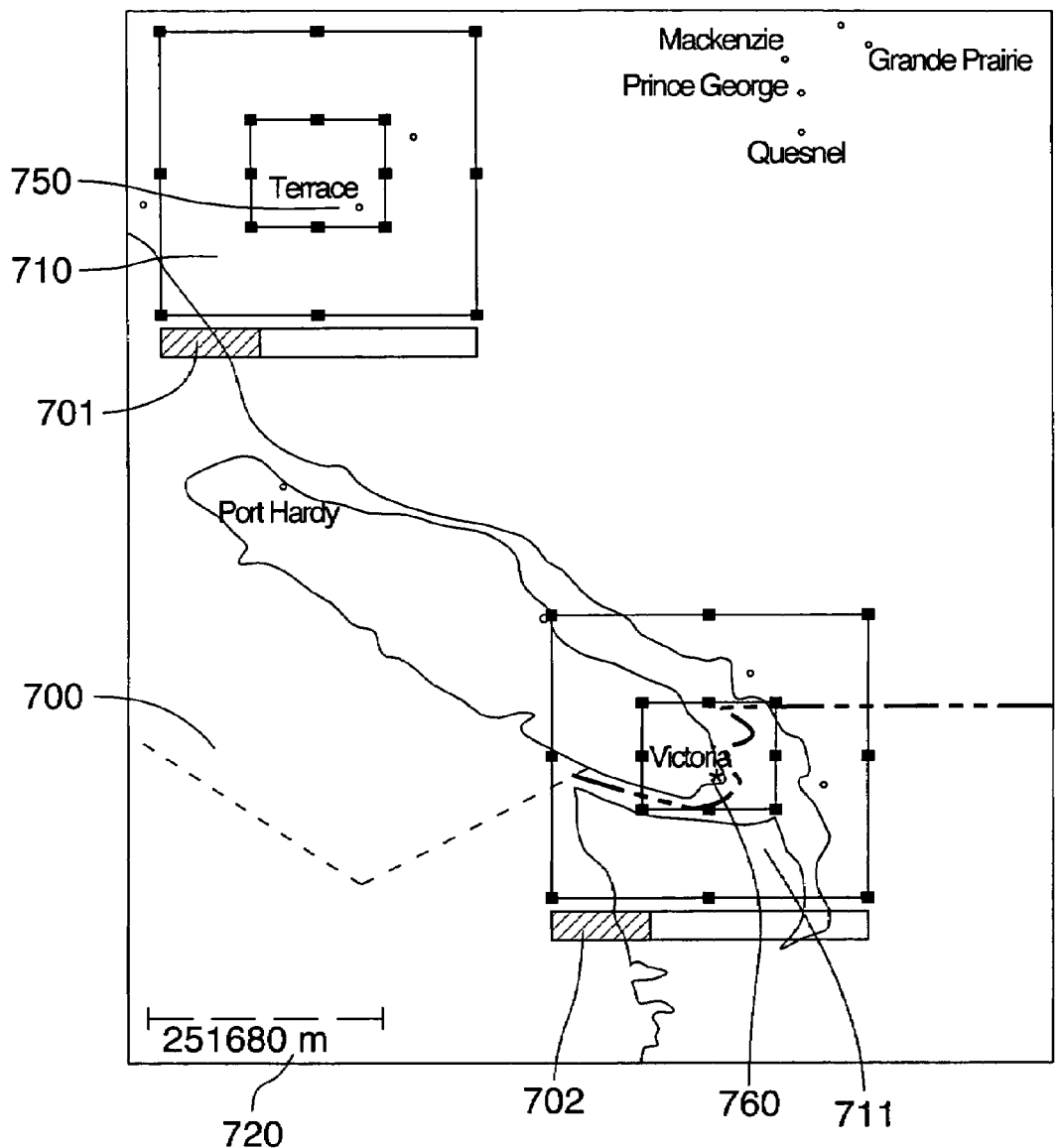
FIG. 7 is a screen capture illustrating a presentation having detail-in-context lenses and associated GUIs for selecting points between which to measure in an original digital image or representation in accordance with an embodiment of the invention.
Figure 8:
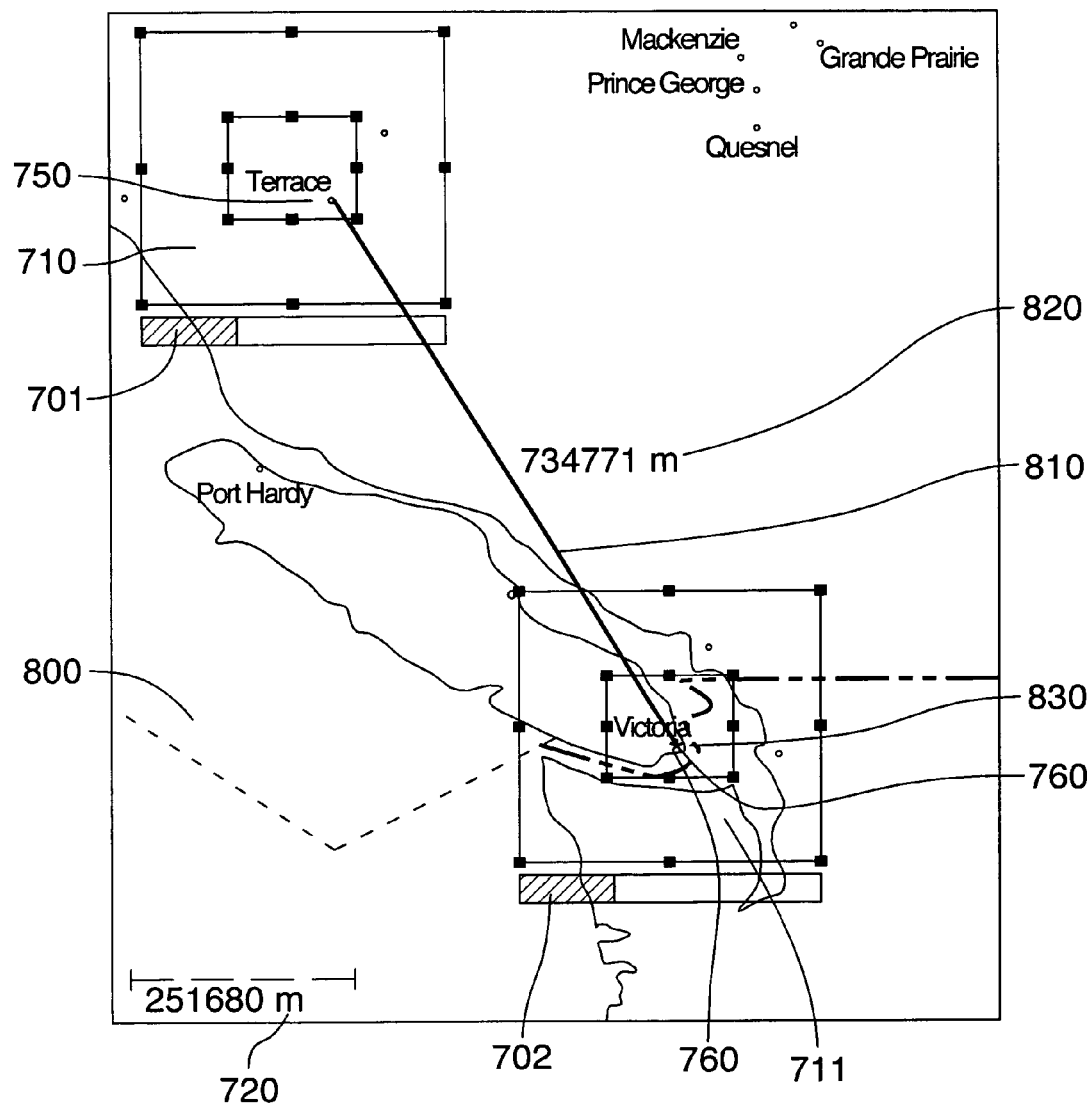
FIG. 8 is a screen capture illustrating a presentation having two detail-in-context lenses, associated GUIs, and a measuring tool GUI for displaying the measurement between selected points in an original digital image or representation in accordance with an embodiment of the invention.

In addition to performing cropping operations, measuring distances between points in a presentation can be performed with greater accuracy by using detail-in-context lenses. FIG. 7 is a screen capture illustrating a presentation 700 having detail-in-context lenses 710, 711 and associated GUIs 701, 702 for selecting points between which to measure in an original digital image or representation in accordance with an embodiment of the invention. To make a measurement between two points in an original digital image, a user first adds detail-in-context lenses 710, 711 to the original image to create a detail-in-context presentation 700. The lens 710, 711 enable the user to view high resolution data in the focus of each lens. The lenses are positioned over selected points 750, 760 and configured as described above. To aid the user in placing the lenses 710, 711, a scale icon 720 may be included in the presentation 700. FIG. 8 is a screen capture illustrating a presentation 800 having two detail-in-context lenses 710, 711, associated GUIs 701, 702, and a measuring tool GUI 810, 820 for displaying the measurement between selected points 750, 760 in an original digital image or representation in accordance with an embodiment of the invention. After selecting points 750, 760. the user may select a measuring tool to determine the distance between the points 750, 760. The measuring tool may be selected using a pull-down menu selection, tool bar, etc. In FIGS. 7 and 8, the points 750, 760 have been selected at the towns of Terrace and Victoria, British Columbia, respectively. The measuring tool may present a measuring tool GUI which may include a measured value icon 820 for displaying the measured value or distance between the selected points 750, 760 and a line segment icon 810 for displaying the measurement path between the selected points 750, 760 to a user. Advantageously, because the selected points 750, 760 are contained within the focal region of each lens 710, 711 which may be displayed at a higher resolution that the surrounding presentation 800, the measured value may be determined more accurately. In FIG. 8, the distance between Terrace and Victoria has a measure value 820 of 734, 771 meters.

In the above embodiment, two lenses 710, 711 are added to the presentation 700, 800 before the measuring tool GUI 810, 820 is activated. However, according to another embodiment, the lenses 710, 711 and measuring tool GUI 810, 820 can be combined. That is, the user may first add a lens 710 to a presentation 800 or the user may move a pre-existing lens into place at, say, the Terrace point 750 in FIG. 8. At this stage, before the Victoria point 760 is selected, the measuring tool GUI 810, 820 is activated. Now, to select the second point 763, the end point 830 of the line segment icon 810 (i.e. the point over the cursor's position) is moved (e.g. with a click and drag operation) by the user. As the end point 830 of the line segment icon 810 is dragged, the second lens 711 is presented over and moves with the end point 830. This facilitates the accurate selection of the second point 760 for defining the distance to be measured (i.e. the line segment between points 750, 760). In addition, at the end of every intermediate line segment, a new lens may be added to the presentation.

Cropping with a Single Detail-In-Context Lens.

Above methods for cropping and measuring an original image are described in which multiple lenses are used. In the following, embodiments for cropping and measuring using a single lens are described. The lens may be a carrier for the cropping or measurement tool, or the lens may be the tool itself. In both the single lens and multiple lenses embodiments, accuracy of cropping and measurement is improved.

Figure 9:
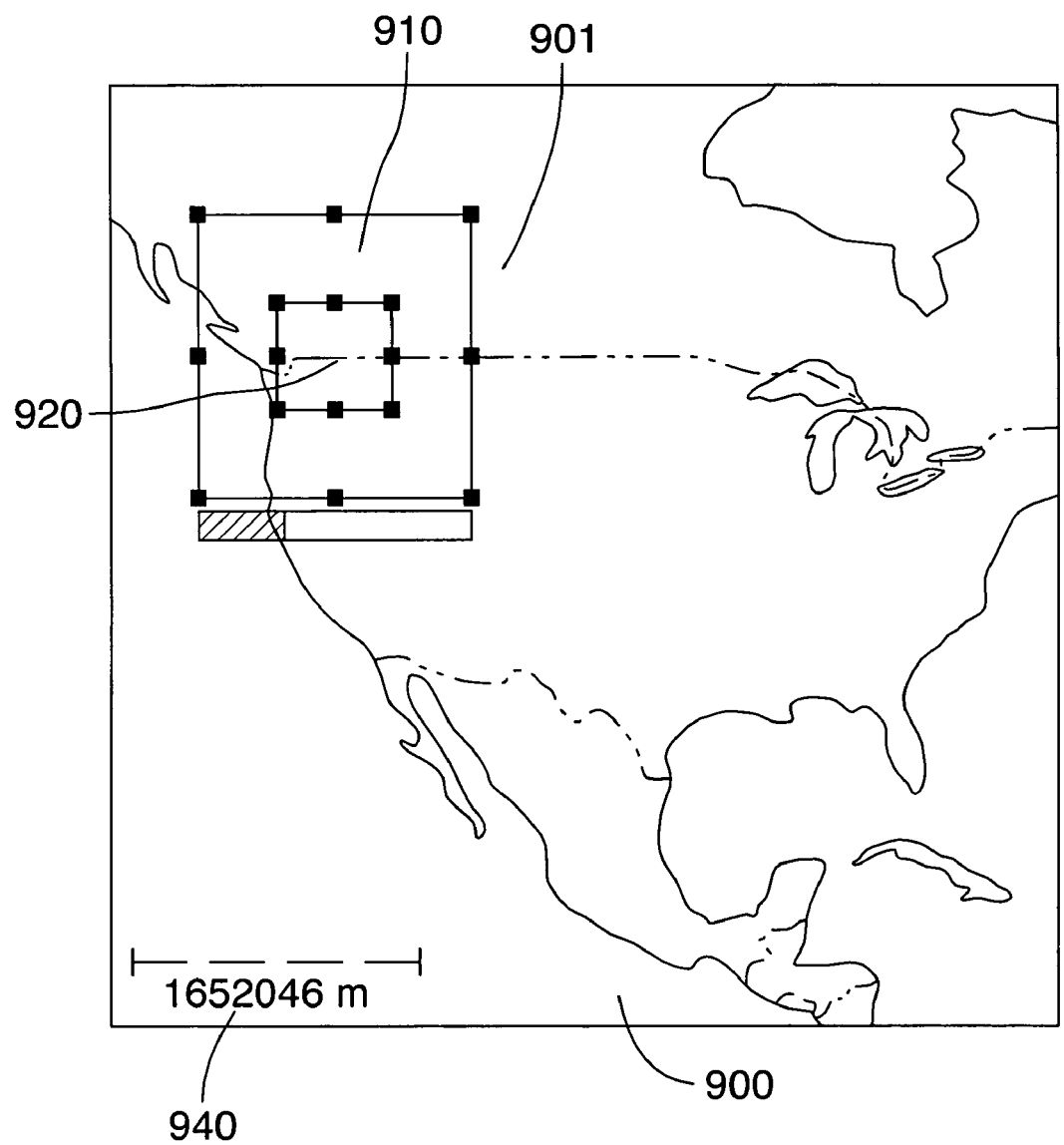
FIG. 9 is a screen capture illustrating a presentation having a single detail-in-context lens and associated GUI for defining the corners of a bounding rectangle GUI for cropping an original digital image or representation in accordance with an embodiment of the invention.
Figure 10:
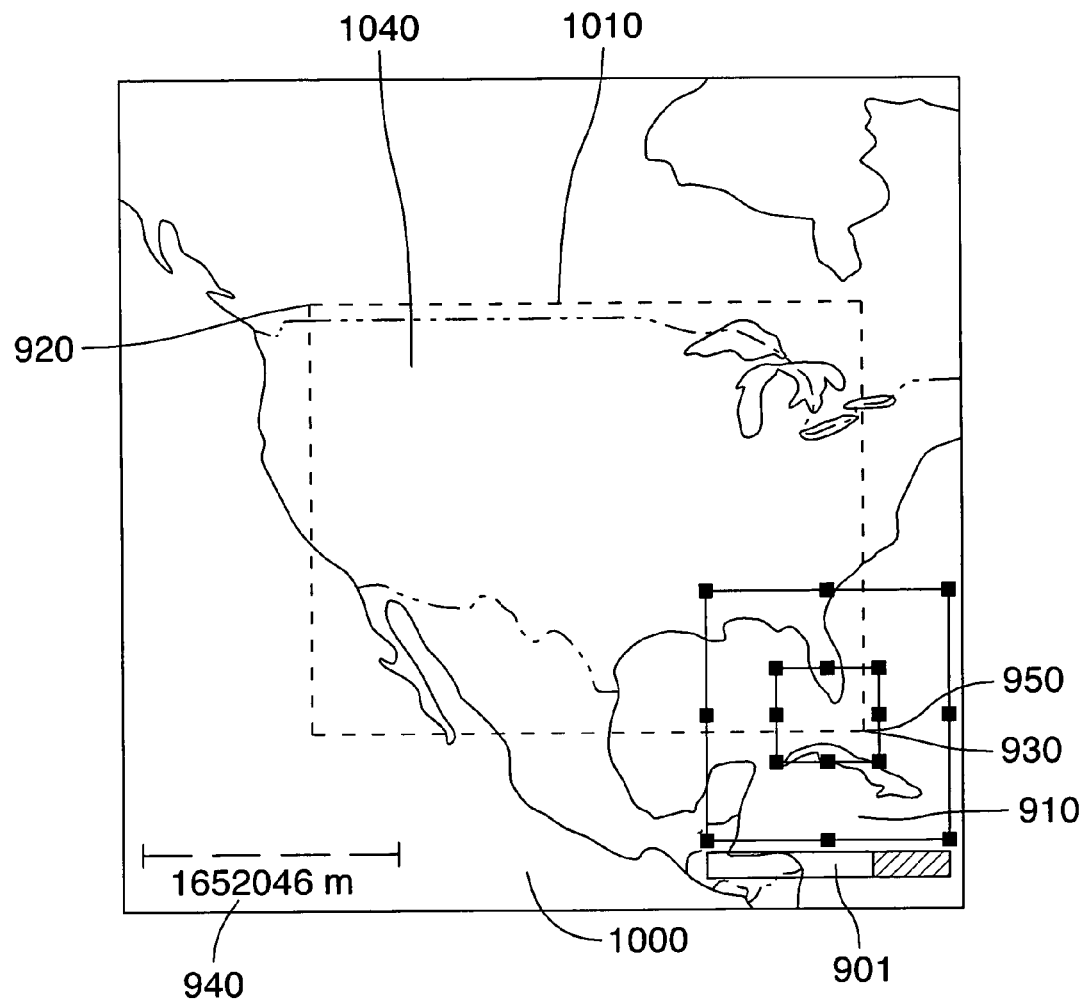
FIG. 10 is a screen capture illustrating a presentation having a single detail-in-context lens, an associated GUI, and a bounding rectangle GUI or icon for cropping an original digital image or representation to produce a cropped image in accordance with an embodiment of the invention.

FIG. 9 is a screen capture illustrating a presentation 900 having a single detail-in-context lens 910 and associated GUI 901 for defining the corners of a bounding rectangle GUI for cropping an original digital image or representation in accordance with an embodiment of the invention. To aid the user in placing the lens 910, a scale icon 940 may be included in the presentation 900. To crop the original image, the user first selects the cropping tool (which is associated with a lens 910) using a pull-down menu selection, tool bar, etc., and then selects a starting or first point 920 using a point and click operation. This places a lens 910 and an associated GUI 901 over the first point 920. Next, the user drags the lens 910 to the second point 930 to complete the definition of the bounding rectangle GUI or icon 1010 an hence define the cropped image 1040 as is shown in FIG. 10. FIG. 10 is a screen capture illustrating a presentation 1000 having a single detail-in-context lens 910, an associated GUI 901, and a bounding rectangle GUI or icon 1010 for cropping an original digital image or representation to produce a cropped image 1040 in accordance with an embodiment of the invention. The bounding rectangle GUI 1010 may be dynamically presented as the lens 910 is dragged diagonally from the first point 920 to the second point 930. The bounding rectangle GUI 1010 defines the area of the cropped image 1040.

Thus, for example, the bounding rectangle GUI 1010 may be drawn by first activating the tool (e.g. tool bar, etc.), followed by a point and click operation to locate the first point or corner 920, while maintaining a depressed mouse selection button, a drag operation during which the lens 910 is presented over the end of the crop line 950 (i.e. over the cursor's position, that is, the end of the crop line 950 is attached to the lens 910 which moves with the crop line end 950 as it is repositioned by a user), and a mouse selection button release to select the second point or corner 930. During this process, the bounding rectangle GUI 1010 is dynamically presented as the end of the crop line 950 is moved by the user.

The bounding rectangle GUI 1010 may have a shape other than rectangular. According to another embodiment, a polygonal shaped bounding GUI may be defined with three or more lens. In this case, the outline of the bounding GUI may pass through each lens. The polygonal shaped bounding GUI may be drawn, say, through an activation step, followed by a point and click to locate the first point, a series of click and drag operations to chose each subsequent point of the polygon, and ending with a double click operation that leaves a lens placed over the last selected point or corner. Between each click and drag operation when the crop line is being repositioned by the user via cursor and mouse, a lens may be presented over the end of the crop line (i.e. over the cursor's position). In other words, the end of the crop line is attached to a lens that moves with the crop line end as it is repositioned by a user.

According to another embodiment, when the cropping tool is activated (e.g. by a drop-down menu selection, tool bar, etc.) and when the standard cursor 401 is located within the presentation 900, 1000, an alternate cursor icon may be displayed over the presentation 900, 1000 to replace the cursor 401 or may be displayed in combination with the cursor 401. The alternate cursor icon may be a lens 910, a cropping cursor icon (not shown), or a combination lens 910 and cropping cursor icon.

Measuring with a Single Detail-In-Context Lens.

Figure 11A:
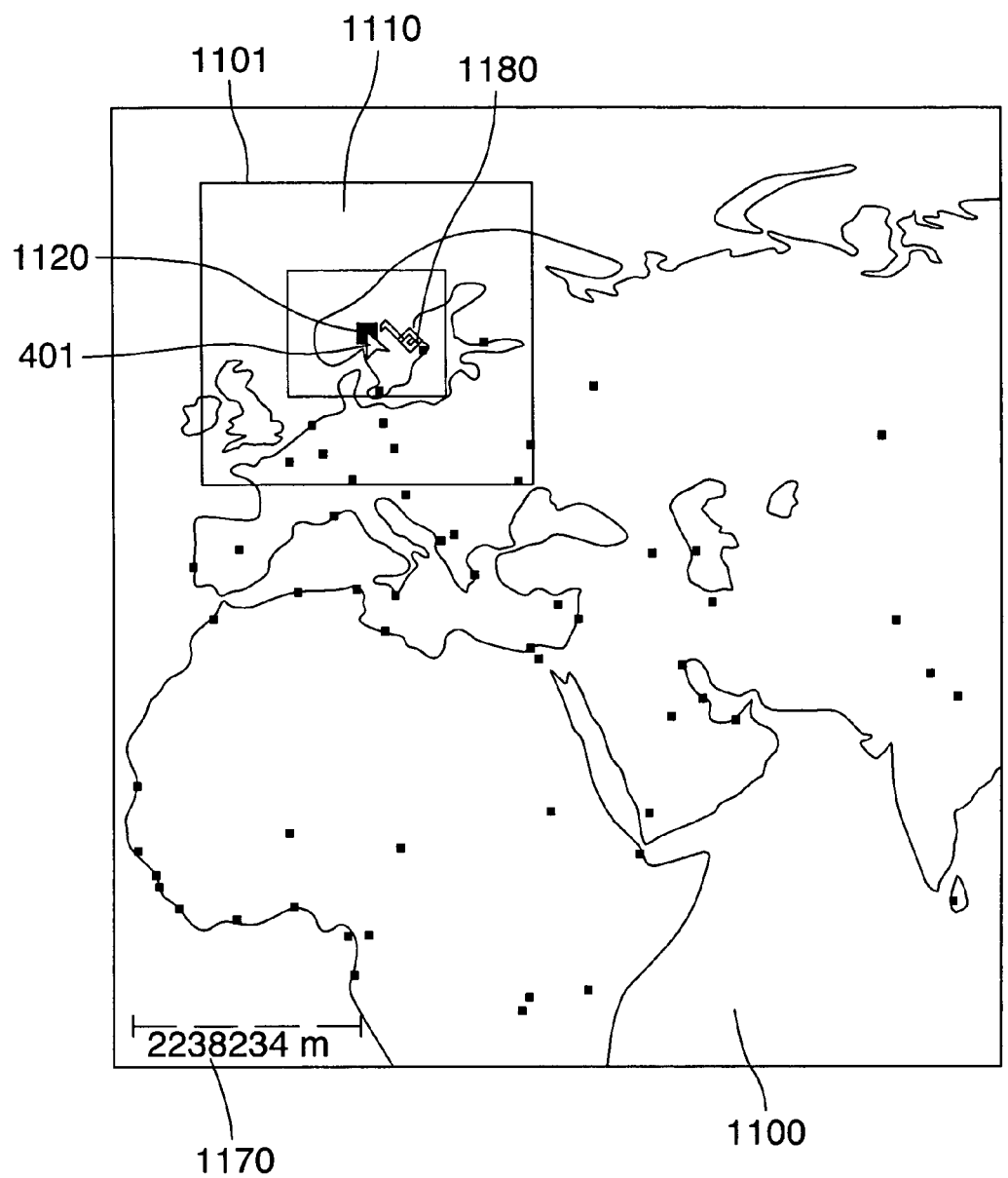
FIG. 11A is a screen capture illustrating a presentation having a single detail-in-context lens and an associated GUI for selecting points between which to measure in an original digital image or representation in accordance with an embodiment of the invention.
Figure 11B:
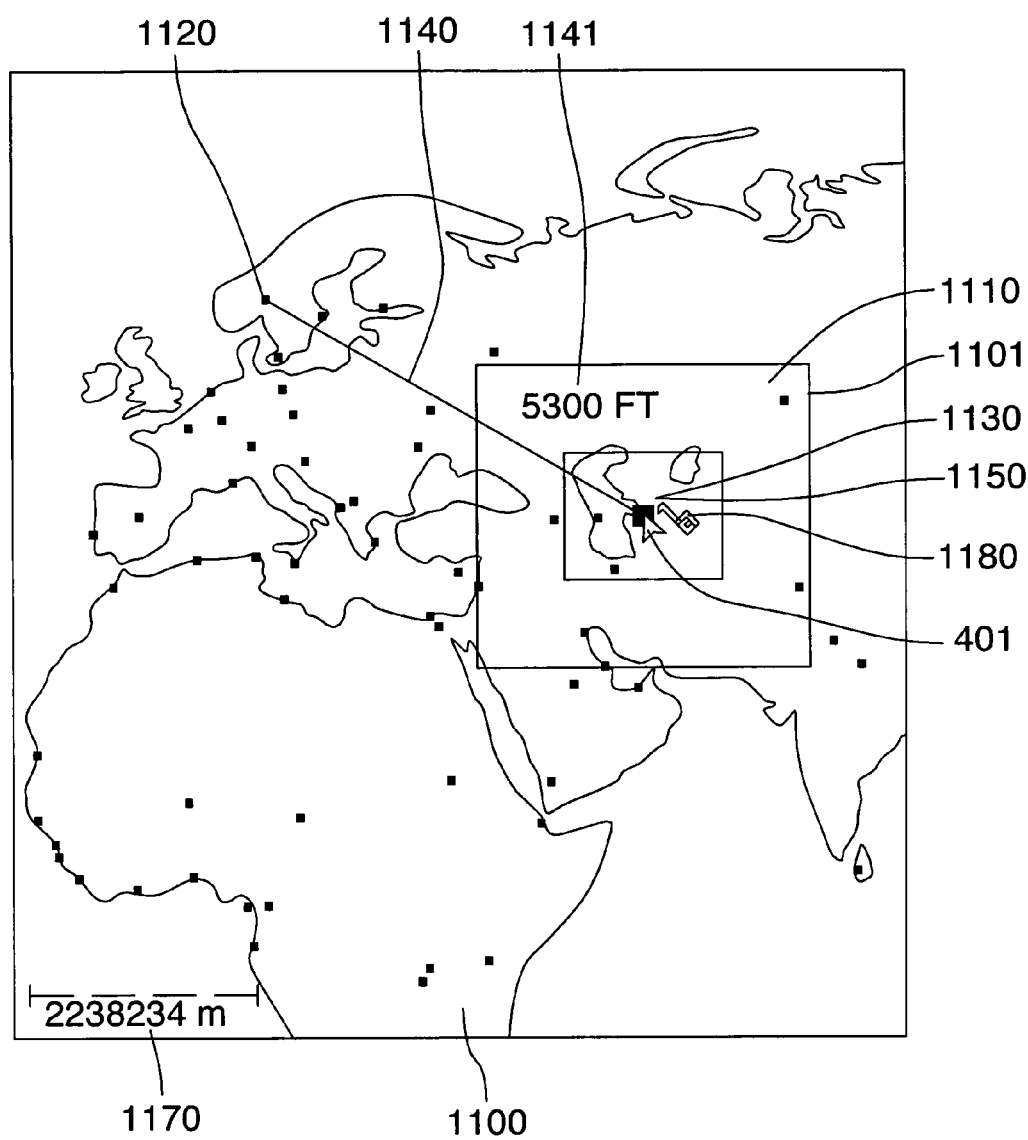
FIG. 11B is a screen capture illustrating a presentation having a single detail-in-context lens, an associated GUI, and a measuring tool GUI for displaying the measurement between two selected points in an original digital image or representation in accordance with an embodiment of the invention.

FIG. 11A is a screen capture illustrating a presentation 1100 having a single detail-in-context lens 1110 and an associated GUI 1101 for selecting points between which to measure in an original digital image or representation in accordance with an embodiment of the invention. FIG. 11B is a screen capture illustrating a presentation 1100 having a single detail-in-context lens 1110, an associated GUI 1101, and a measuring tool GUI 1140, 1141, for displaying the measurement between selected points 1120, 1130 in an original digital image or representation in accordance with an embodiment of the invention. And, FIG. 11C is a screen capture illustrating a presentation 1100 having a single detail-in-context lens 1110, an associated GUI 1101, and a measuring tool GUI 1140, 1142, 1142, 1143 for displaying the measurement between selected points 1120, 1130, 1160 in an original digital image or representation in accordance with an embodiment of the invention.

To make a measurement in the original image 1100, the user first selects the measuring tool (which is associated with a lens 1110) using a pull-down menu selection, tool bar, etc., and then selects a starting or first point 1120 using a point and click operation. This places a lens 1110 and an associated GUI 1101 over the first point 1120 as shown in FIG. 11A. A measuring tool icon 1180 may also be displayed over the first point 1120 as mentioned above. The lens 1110 enables the user to view high resolution data in its focus. Next, the user drags the lens 1110 to select a second point 1130 for the measurement as shown in FIG. 11B. The measuring tool may present a measuring tool GUI which may include a measured value icon 1141 for displaying the measured value or distance between the selected points 1120, 1130 and a line segment icon 1140 for displaying the measurement path between the selected points 1120, 1130 as shown in FIG. 11B. The measuring tool GUI 1140, 1141 may be dynamically presented as the lens 1110 is dragged from the first point 1120 to the second point 1130.

Figure 11C:
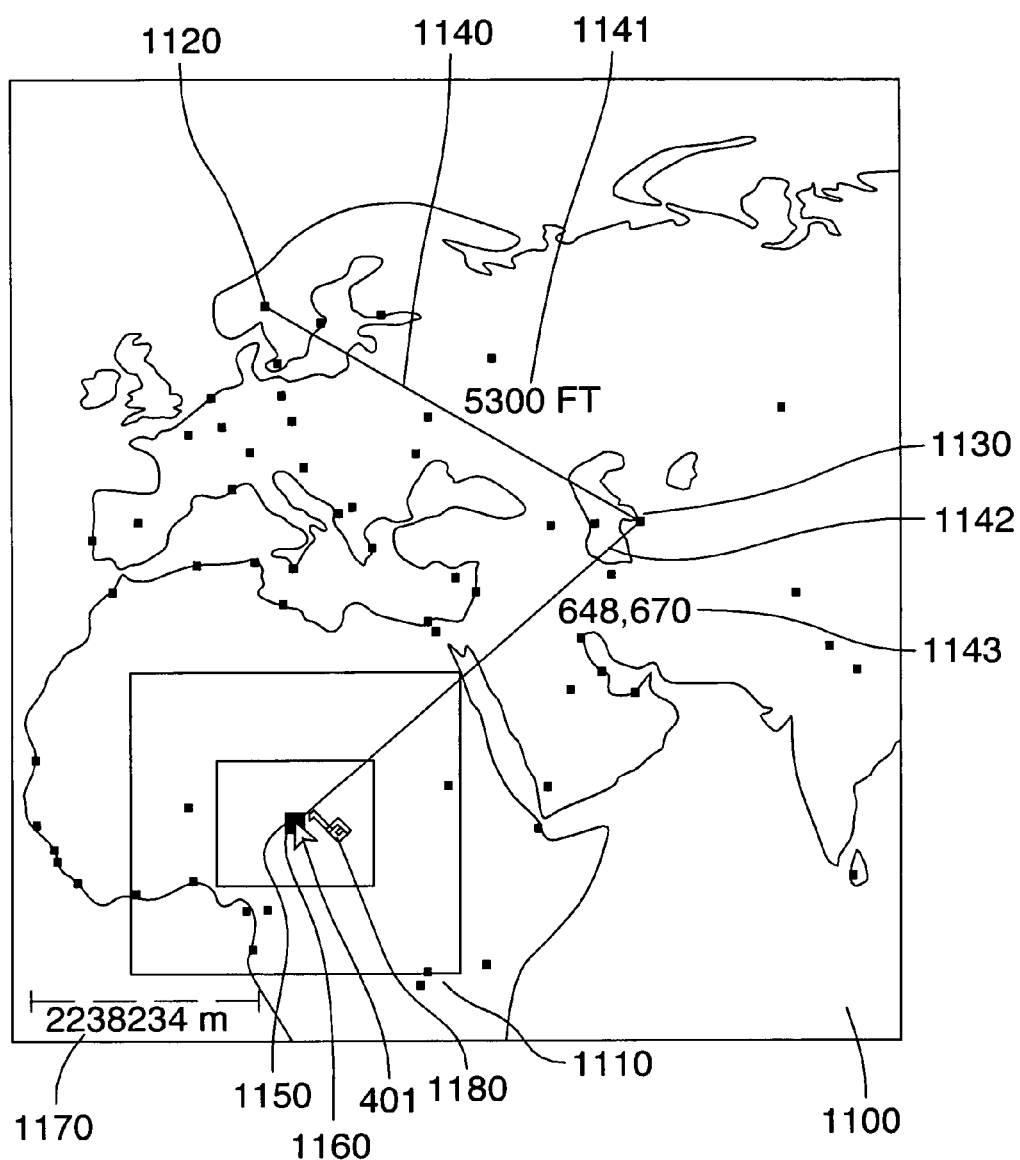
FIG. 11C is a screen capture illustrating a presentation having a single detail-in-context lens, an associated GUI, and a measuring tool GUI for displaying the measurement between multiple selected points in an original digital image or representation in accordance with an embodiment of the invention.

As shown in FIGS. 11B and 11C, a user may make linked measurements in one or more operations. Linked line segment icons 1140, 1142 may be drawn, say, through an activation step, followed by a point and click to locate the first point 1120, a series of click and drag operations to chose each subsequent point 1130, 1160 of the linked line segment, and ending with a double click operation that leaves a lens 1110 placed over the last selected point 1160. Between each click and drag operation when the line segment icon 1140, 1142 is being repositioned by the user via cursor and mouse, a lens 1110 may be presented over the end of the line segment 1150 (i.e. over the cursor's position). In other words, the end of the line segment 1150 is attached to a lens 1110 that moves with the end of the line segment 1150 as it is repositioned by a user.

To aid the user in placing the lens 1110, a scale icon 1170 may be included in the presentation 1100. In addition, when the measuring tool is activated (e.g. by a drop-down menu selection, tool bar, etc.) and when the standard cursor 401 is located within the presentation 1100, an alternate cursor icon may be displayed over the presentation 1100 to replace the cursor 401 or may be displayed in combination with the cursor 401. The alternate cursor icon may be a lens 1110, a measuring cursor icon 1180, or a combination lens 1110 and measuring cursor icon 1180. Moreover, as shown in FIG. 11B, the line segment icon 1140 may be presented as an exclusive OR (XOR) with the underlying portion of the original or background image 1100.

Method.

Figure 12:
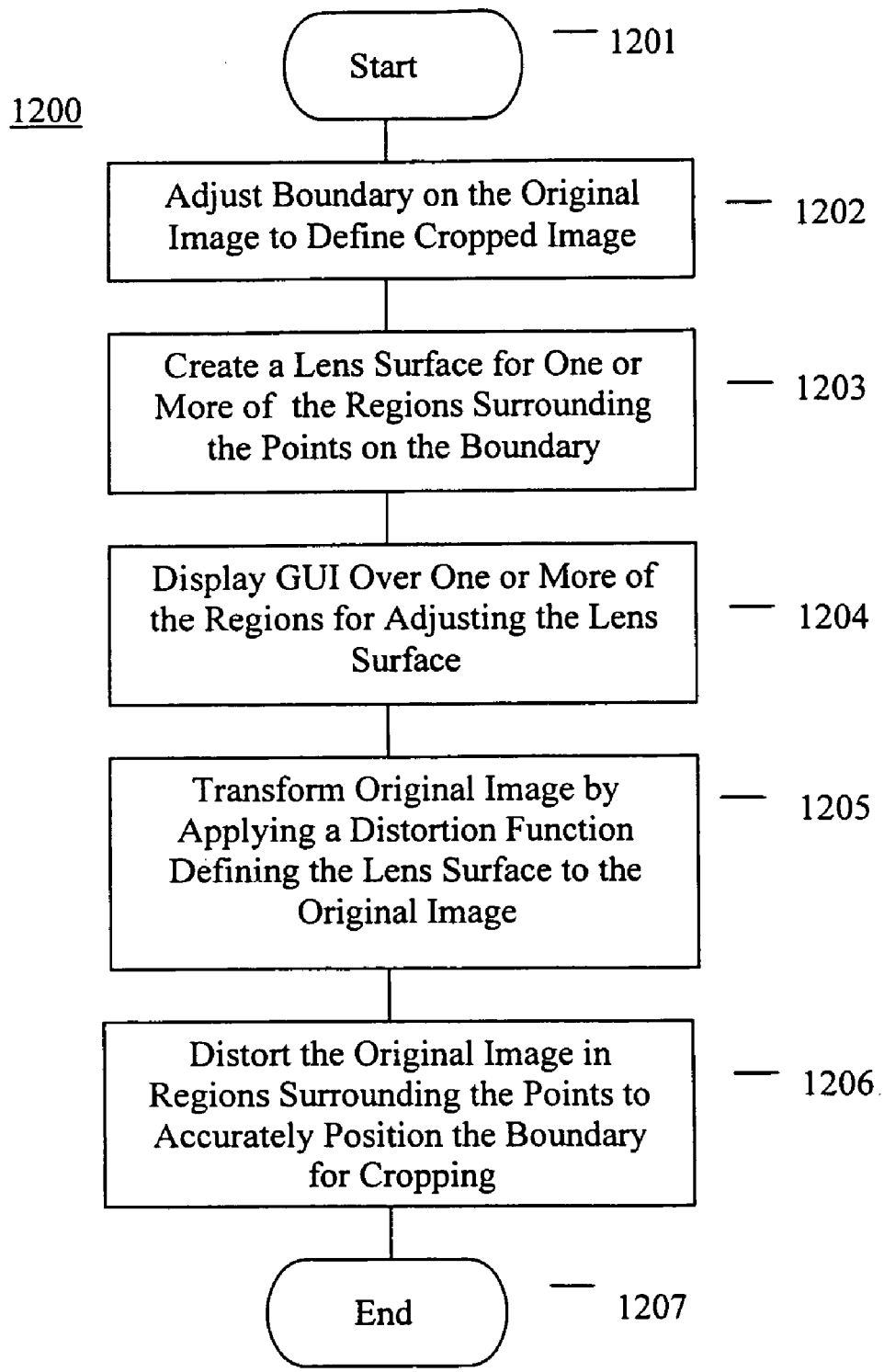
FIG. 12 is a flow chart illustrating a method for cropping a computer generated original image on a display in accordance with an embodiment of the invention; and, FIG. 13 is a flow chart illustrating a method for measuring within a computer generated original image on a display in accordance with an embodiment of the invention.

FIG. 12 is a flow chart 1200 illustrating a method for cropping a computer generated original image on a display 340 in accordance with an embodiment of the invention. At step 1201, the method starts.

At step 1202, a user-selected movable boundary 610, 1010 on the original image is adjusted to define a cropped image 640, 1040 within the boundary, the boundary being defined by two or more points 620, 630, 920, 930 on the original image.

At step 1203, a lens surface 510, 511, 910 is created for one or more of the regions surrounding the points 620, 630, 920, 930.

At step 1204, a GUI 501, 502, 901 is displayed over one or more of the regions for adjusting the lens surface 510, 511, 910.

At step 1205, the original image is transformed by applying a distortion function defining the lens surface to the original image.

At step 1206, the original image is distorted 500, 600, 900, 1000 in regions surrounding the points, whereby the boundary 610, 1010 is accurately positioned for cropping.

At step 1207, the method ends.

Figure 13:
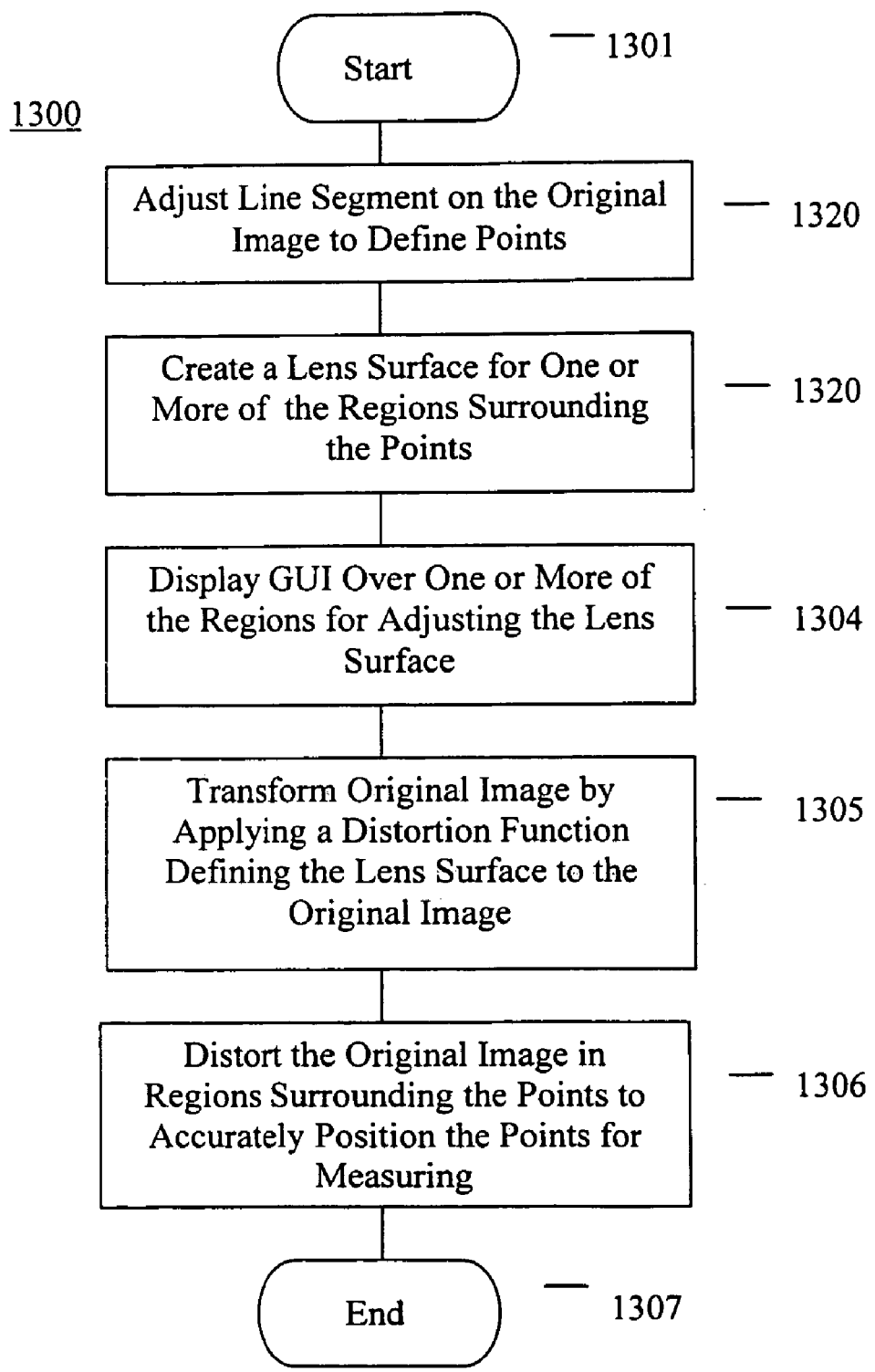

FIG. 13 is a flow chart 1300 illustrating a method for measuring within a computer generated original image on a display 340 in accordance with an embodiment of the invention. At step 1301, the method starts.

At step 1302, a user-selected movable line segment 810, 1140, 1142 on the original image is adjusted to define points 750, 760, 1120, 1130, 1160 on the original image for measuring between.

At step 1303, a lens surface 710, 711, 1110 is created for one or more of the regions surrounding the points 750, 760, 1120, 1130, 1160.

At step 1304, a GUI 701, 702, 1101 is displayed over one or more of the regions for adjusting the lens surface 710, 711, 1110.

At step 1305, the original image is transformed by applying a distortion function defining the lens surface to the original image.

At step 1306, the original image is distorted 700, 800, 1100 in regions surrounding the points, whereby the points 750, 760, 1120, 1130, 1160 are accurately positioned for measuring.

At step 1307, the method ends.

Data Carrier Product.

The sequences of instructions which when executed cause the method described herein to be performed by the exemplary data processing system of FIG. 3 can be contained in a data carrier product according to one embodiment of the invention. This data carrier product can be loaded into and run by the exemplary data processing system of FIG. 3.

Computer Software Product.

The sequences of instructions which when executed cause the method described herein to be performed by the exemplary data processing system of FIG. 3 can be contained in a computer software product according to one embodiment of the invention. This computer software product can be loaded into and run by the exemplary data processing system of FIG. 3.

Integrated Circuit Product.

The sequences of instructions which when executed cause the method described herein to be performed by the exemplary data processing system of FIG. 3 can be contained in an integrated circuit product including a coprocessor or memory according to one embodiment of the invention. This integrated circuit product can be installed in the exemplary data processing system of FIG. 3.

Although preferred embodiments of the invention have been described herein, it will be understood by those skilled in. the art that variations may be made thereto without departing from the spirit of the invention or the scope of the appended claims.

What is claimed is:

1. A system for cropping an original image presented on a display, comprising:
   a processor coupled to memory and the display; and,
   modules within the memory and executed by the processor, the modules including:
   a module for receiving one or more signals for adjusting a boundary on the original image to define a cropped image within the boundary, the boundary defined by two or more points on the original image;
   a module for distorting the original image in regions surrounding the points by applying a lens to one or more of the regions, whereby the boundary is accurately positioned for cropping; and,
   a module for displaying a graphical user interface ("GUI") over one or more of the regions for adjusting the lens, wherein the lens includes a focal region and a base region.

2. The system of claim 1 wherein the focal region has a magnification which varies across the base region to provide a continuous transition from the focal region to the original image.

3. The system of claim 2 wherein the focal region has a size and a shape and further comprising a module for receiving one or more signals for adjusting at least one of the size, the shape, and the magnification of the focal region.

4. The system of claim 3 wherein the one or more signals are received through the GUI.

5. The system of claim 4 wherein the GUI has means for adjusting at least one of the size, the shape, and the magnification of the focal region.

6. The system of claim 5 wherein at least some of the means are icons.

7. The system of claim 5 wherein the means for adjusting the size and the shape is at least one handle icon positioned on a perimeter of the focal region.

8. The system of claim 5 wherein the means for adjusting the magnification is a slide bar icon.

9. The system of claim 2 wherein the base region has a size and a shape and further comprising a module for receiving one or more signals through the GUI for adjusting at least one of the size and the shape of the base region, wherein the GUI has one or more handle icons positioned on a perimeter of the base region for adjusting at least one of the size and the shape of the base region.

10. The system of claim 1 wherein the GUI includes at least one of: a slide bar icon for adjusting a magnification for the lens; a slide bar icon for adjusting a degree of scooping for the lens; a bounding rectangle icon with at least one handle icon for adjusting a size and a shape for the focal region; a bounding rectangle icon with at least one handle icon for adjusting a size and a shape for the base region; a move icon for adjusting a location for the lens on the boundary; a pickup icon for adjusting a location for the base region within the original image; and, a fold icon for adjusting a location for the focal region relative to the base region.

11. The system of claim 1 and further comprising an input device coupled to the processor for generating the one or more signals, the input device for manipulation by a user to move a cursor on the display.

12. The system of claim 1 wherein the boundary is a polygon.

13. The system of claim 1 wherein the original image has one or more layers.

14. The system of claim 13 wherein the regions have a predetermined selection of the layers.

15. The system of claim 13 wherein the cropped image has a predetermined selection of the layers.

16. A system for measuring within an original image presented on a display, comprising:

a processor coupled to memory and the display; and,
modules within the memory and executed by the processor, the modules including:
a module for receiving one or more signals for adjusting a line segment on the original image to define points on the original image for measuring between;
a module for distorting the original image in regions surrounding the points by applying a lens to one or more of the regions, whereby the points are accurately positioned for measuring; and,
a module for displaying a graphical user interface ("GUI") over one or more of the regions for adjusting the lens, wherein the lens includes a focal region and a base region.

17. The system of claim 16 wherein the focal region has a magnification which varies across the base region to provide a continuous transition from the focal region to the original image.

18. The system of claim 17 wherein the focal region has a size and a shape and further comprising a module for receiving one or more signals for adjusting at least one of the size, the shape, and the magnification of the focal region.

19. The system of claim 18 wherein the one or more signals are received through the GUI.

20. The system of claim 19 wherein the GUI has means for adjusting at least one of the size, the shape, and the magnification of the focal region.

21. The system of claim 20 wherein at least some of the means are icons.

22. The system of claim 20 wherein the means for adjusting the size and the shape is at least one handle icon positioned on a perimeter of the focal region.

23. The system of claim 20 wherein the means for adjusting the magnification is a slide bar icon.

24. The system of claim 17 wherein the base region has a size and a shape and further comprising a module for receiving one or more signals through the GUI for adjusting at least one of the size and the shape of the base region, wherein the GUI has one or more handle icons positioned on a perimeter of the base region for adjusting at least one of the size and the shape of the base region.

25. The system of claim 16 wherein the GUI includes at least one of: a slide bar icon for adjusting a magnification for the lens; a slide bar icon for adjusting a degree of scooping for the lens; a bounding rectangle icon with at least one handle icon for adjusting a size and a shape for the focal region; a bounding rectangle icon with at least one handle icon for adjusting a size and a shape for the base region; a move icon for adjusting a location for the lens on the line segment; a pickup icon for adjusting a location for the base region within the original image; and, a fold icon for adjusting a location for the focal region relative to the base region.

26. The system of claim 16 and further comprising an input device coupled to the processor for generating the one or more signals, the input device for manipulation by a user to move a cursor on the display.

27. The system of claim 16 wherein the line segment is a straight line.

28. A system for cropping an original image presented on a display, comprising:
a processor coupled to memory and the display; and,
modules within the memory and executed by the processor, the modules including:
a module for receiving one or more signals for adjusting a boundary on the original image to define a cropped image within the boundary, the boundary defined by two or more points on the original image; and,
a module for distorting the original image in respective regions surrounding the points to produce a distorted image by displacing the original image onto a lens for each region and perspectively projecting the displacing onto a plane in a direction aligned with a viewpoint for the region, whereby the boundary is accurately positioned for cropping.

29. The system of claim 28 wherein the module for distorting further includes a module for displaying the boundary over the distorted image on the display.

30. The system of claim 29 and further comprising a module for displaying a graphical user interface ("GUI") over one or more of the regions for adjusting the lens.

31. The system of claim 30 wherein the lens includes a focal region for one of the points at least partially surrounded by a base region, the lens having a magnification, the magnification being uniform in the focal region and varying in the base region such that the lens is continuous from regions outside the lens through the base region to the focal region, and the GUI includes at least one of: a slide bar icon for adjusting the magnification for the lens; a slide bar icon for adjusting a degree of scooping for the lens; a bounding rectangle icon with at least one handle icon for adjusting a size and a shape for the focal region; a bounding rectangle icon with at least one handle icon for adjusting a size and a shape for the base region; a move icon for adjusting a location for the lens on the boundary; a pickup icon for adjusting a location for the base region within the original image; and, a fold icon for adjusting a location for the focal region relative to the base region.

32. A system for measuring within an original image presented on a display, comprising:
a processor coupled to memory and the display; and,
modules within the memory and executed by the processor, the modules including:
a module for receiving one or more signals for adjusting a line segment on the original image to define points on the original image for measuring between; and,
a module for distorting the original image in respective regions surrounding the points to produce a distorted image by displacing the original image onto a lens for each region and perspectively projecting the displacing onto a plane in a direction aligned with a viewpoint for the region, whereby the points are accurately positioned for measuring.

33. The system of claim 32 wherein the module for distorting further includes a module for displaying the line segment over the distorted image on the display.

34. The system of claim 33 and further comprising a module for displaying a graphical user interface ("GUI") over one or more of the regions for adjusting the lens.

35. The system of claim 34 wherein the lens includes a focal region for one of the points at least partially surrounded by a base region, the lens having a magnification, the magnification being uniform in the focal region and varying in the base region such that the lens is continuous from regions outside the lens through the base region to the focal region, and the GUI includes at least one of: a slide bar icon for adjusting the magnification for the lens; a slide bar icon for adjusting a degree of scooping for the lens; a bounding rectangle icon with at least one handle icon for adjusting a size and a shape for the focal region; a bounding rectangle icon with at least one handle icon for adjusting a size and a shape for the base region; a move icon for adjusting a location for the lens on the line segment; a pickup icon for adjusting a location for the base region within the original image; and, a fold icon for adjusting a location for the focal region relative to the base region.

* * * * *